US012798528B2

(12) United States Patent
Kikawa et al.

(10) Patent No.: US 12,798,528 B2
(45) Date of Patent: Nov. 17, 2026

(54) CONTROL APPARATUS FOR BRAKE APPARATUS, METHOD FOR CONTROLLING BRAKE APPARATUS, AND BRAKE APPARATUS

(71) Applicant: Hitachi Astemo, Ltd., Hitachinaka (JP)

(72) Inventors: Masayuki Kikawa, Hitachinaka (JP); Norikazu Matsuzaki, Hitachinaka (JP); Naoshi Yamaguchi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 535 days.

(21) Appl. No.: 18/283,078

(22) PCT Filed: Mar. 9, 2022

(86) PCT No.: PCT/JP2022/010271
§ 371 (c)(1),
(2) Date: Sep. 20, 2023

(87) PCT Pub. No.: WO2022/244405
PCT Pub. Date: Nov. 24, 2022

(65) Prior Publication Data

US 2024/0166178 A1 May 23, 2024

(30) Foreign Application Priority Data

May 20, 2021 (JP) ................................ 2021-085002

(51) Int. Cl.
*B60T 8/172* (2006.01)
*B60T 1/06* (2006.01)
(Continued)

(52) U.S. Cl.
CPC .............. *B60T 8/172* (2013.01); *B60T 1/065* (2013.01); *B60T 8/171* (2013.01); *B60T 13/746* (2013.01);
(Continued)

(58) Field of Classification Search
CPC .......... B60T 8/94; B60T 8/885; B60T 13/142; B60T 13/148; B60T 13/662;
(Continued)

(56) References Cited

U.S. PATENT DOCUMENTS 8,972,140 B2 * 3/2015 Kotake ................ B60T 13/741
701/70
12,139,112 B2 * 11/2024 Saotome .............. B60T 13/745
(Continued)

FOREIGN PATENT DOCUMENTS

| | | |
|---|---|---|
| JP | 2010-76479 | 4/2010 |
| JP | 2015-163486 | 9/2015 |
| JP | 2020-192836 | 12/2020 |

OTHER PUBLICATIONS

International Search Report issued May 17, 2022 in International Application No. PCT/JP2022/010271, with English translation.
(Continued)

*Primary Examiner* — David R Morris
(74) *Attorney, Agent, or Firm* — Wenderoth, Lind & Ponack, L.L.P.

(57) ABSTRACT

A parking brake control apparatus acquires a first physical amount indicating a change in a current applied to an electric motor (for example, a gradient of a change in a current) at the time of an application operation. The parking brake control apparatus sets a second physical amount indicating completion of the application operation so as to make it smaller when the first physical amount (for example, the gradient of the change in the current) exceeds a predetermined threshold value, compared to when the first physical amount is equal to or smaller than the threshold value. The parking brake control apparatus determines the completion of the application operation when a physical amount indi-
(Continued)

cating the application operation (for example, a current value) reaches the second physical amount.

8 Claims, 12 Drawing Sheets

(51) Int. Cl.

| | |
|---|---|
| ***B60T 8/171*** | (2006.01) |
| ***B60T 13/74*** | (2006.01) |
| ***F16D 55/226*** | (2006.01) |
| ***F16D 65/18*** | (2006.01) |
| *F16D 121/04* | (2012.01) |
| *F16D 121/24* | (2012.01) |
| *F16D 125/06* | (2012.01) |

(52) U.S. Cl.
CPC ........... *F16D 55/226* (2013.01); *F16D 65/18* (2013.01); *B60T 2220/04* (2013.01); *F16D 2121/04* (2013.01); *F16D 2121/24* (2013.01); *F16D 2125/06* (2013.01)

(58) Field of Classification Search
CPC ...... B60T 13/686; B60T 13/745; B60T 17/22; B60T 2270/304; B60T 2270/306; B60T 2270/404; B60T 2270/413; B60T 2270/82; B60T 7/042
See application file for complete search history.

(56) References Cited

U.S. PATENT DOCUMENTS

| | | | | |
|---|---|---|---|---|
| 2009/0206650 | A1* | 8/2009 | Ninoyu ................. | B60T 13/588 303/3 |
| 2010/0072811 | A1 | 3/2010 | Kondo et al. | |
| 2021/0001830 | A1 | 1/2021 | Uraoka | |
| 2022/0212646 | A1 | 7/2022 | Urano et al. | |

OTHER PUBLICATIONS

Written Opinion of the International Searching Authority issued May 17, 2022 in International Application No. PCT/JP2022/010271, with English translation.
Extended European Search Report issued Oct. 15, 2024 in corresponding European Patent Application No. 22804325.3.

* cited by examiner

| MOTOR DRIVING INSTRUCTION | OPERATION OF DRIVING CIRCUIT (DRIVER) |
|---|---|
| STOP | OPEN MOTOR TERMINALS |
| APPLICATION | APPLY VOLTAGE IN APPLICATION DIRECTION |
| RELEASE | APPLY VOLTAGE IN RELEASE DIRECTION |
| MOTOR BRAKE | SHORT MOTOR TERMINALS |

CONTROL APPARATUS FOR BRAKE APPARATUS, METHOD FOR CONTROLLING BRAKE APPARATUS, AND BRAKE APPARATUS

TECHNICAL FIELD

The present disclosure relates to a control apparatus for a brake apparatus, a method for controlling a brake apparatus, and a brake apparatus.

BACKGROUND ART

PTL 1 discloses a brake system including a disk brake, an electric parking brake mechanism, an electric booster, and a master cylinder. The disk brake generates a braking force by pressing brake pads against a disk rotor according to an MC hydraulic pressure supplied to the electric booster and the master cylinder. The electric parking brake mechanism causes the disk brake to generate a parking braking force by moving a WC piston of the disk brake according to an operation on a parking brake switch. When the electric parking brake mechanism is actuated during the brake operation, the electric booster controls an electric actuator so as to maintain a constant hydraulic amount in a hydraulic circuit.

CITATION LIST

Patent Literature

PTL 1: Japanese Patent Application Laid-open No. 2015-163486

SUMMARY OF INVENTION

Technical Problem

According to the technique disclosed in PTL 1, an uncomfortable feeling toward a brake pedal reaction force is suppressed by using the electric booster to compensate for a change in the hydraulic pressure corresponding to the advancement of the piston, which presses the brake pads by the electric parking brake mechanism. This raises a possibility of making it impossible to suppress the unconformable feeling toward the pedal reaction force in a case where an electrically non-controllable (nonelectric) booster such as a negative-pressure booster is used.

Solution to Problem

One of objects of the present invention is to provide a control apparatus for a brake apparatus, a method for controlling a brake apparatus, and a brake apparatus capable of suppressing an uncomfortable feeling toward a brake pedal reaction force when an electric parking brake mechanism is actuated regardless of the configuration of a brake system.

According to one aspect of the present invention, a control apparatus for a brake apparatus includes a hydraulic mechanism configured to provide a braking force to a vehicle by pressing a frictional member against a rotational member rotating together with a wheel based on a hydraulic pressure, and a parking brake mechanism configured to hold the braking force by an electric motor controlled by a control portion. The control portion acquires a first physical amount indicating a change in a current applied to the electric motor, the hydraulic pressure, or a physical amount regarding a stroke of a brake pedal at the time of an application operation, which is a holding operation of the parking brake mechanism. The control portion sets a second physical amount indicating completion of the application operation so as to make it smaller when the first physical amount exceeds a predetermined threshold value, compared to when the first physical amount is equal to or smaller than the threshold value. The control portion determines the completion of the application operation when a physical amount indicating the application operation reaches the second physical amount.

Further, according to one aspect of the present invention, a method for controlling a brake apparatus is provided. The brake apparatus includes a hydraulic mechanism configured to provide a braking force to a vehicle by pressing a frictional member against a rotational member rotating together with a wheel based on a hydraulic pressure, and a parking brake mechanism configured to hold the braking force by an electric motor. The method includes causing a control portion configured to control driving of the electric motor to acquire a first physical amount indicating a change in a current applied to the electric motor, the hydraulic pressure, or a physical amount regarding a stroke of a brake pedal at the time of an application operation, which is a holding operation of the parking brake mechanism, set a second physical amount indicating completion of the application operation so as to make it smaller when the first physical amount exceeds a predetermined threshold value compared to when the first physical amount is equal to or smaller than the threshold value, and determine the completion of the application operation when a physical amount indicating the application operation reaches the second physical amount.

Further, according to one aspect of the present invention, a brake apparatus includes a hydraulic mechanism configured to provide a braking force to a vehicle by pressing a frictional member against a rotational member rotating together with a wheel based on a hydraulic pressure, a parking brake mechanism configured to hold the braking force by an electric motor, and a control apparatus including a control portion configured to control the electric motor. The control portion acquires a first physical amount indicating a change in a current applied to the electric motor, the hydraulic pressure, or a physical amount regarding a stroke of a brake pedal at the time of an application operation, which is a holding operation of the parking brake mechanism. The control portion sets a second physical amount indicating completion of the application operation so as to make it smaller when the first physical amount exceeds a predetermined threshold value, compared to when the first physical amount is equal to or smaller than the threshold value. The control portion determines the completion of the application operation when a physical amount indicating the application operation reaches the second physical amount.

According to the aspects of the present invention, the uncomfortable feeling toward the brake pedal reaction force when the parking brake mechanism (the electric parking brake mechanism) is actuated can be suppressed regardless of the configuration of the brake system.

BRIEF DESCRIPTION OF DRAWINGS

FIG. 3 is a block diagram (a circuit configuration diagram) illustrating a control apparatus illustrated in FIG. 1 together with the rear wheel-side disk brake and the like.

DESCRIPTION OF EMBODIMENTS

In the following description, a control apparatus for an electric brake and an electric brake apparatus according to an embodiment will be described citing an example in which they are mounted on a four-wheeled automobile with reference to the accompanying drawings. Each step in flowcharts illustrated in FIGS. 5 to 8 will be represented by a symbol "S" (for example, each step will be indicated like step 1="S1").

Figure 1:
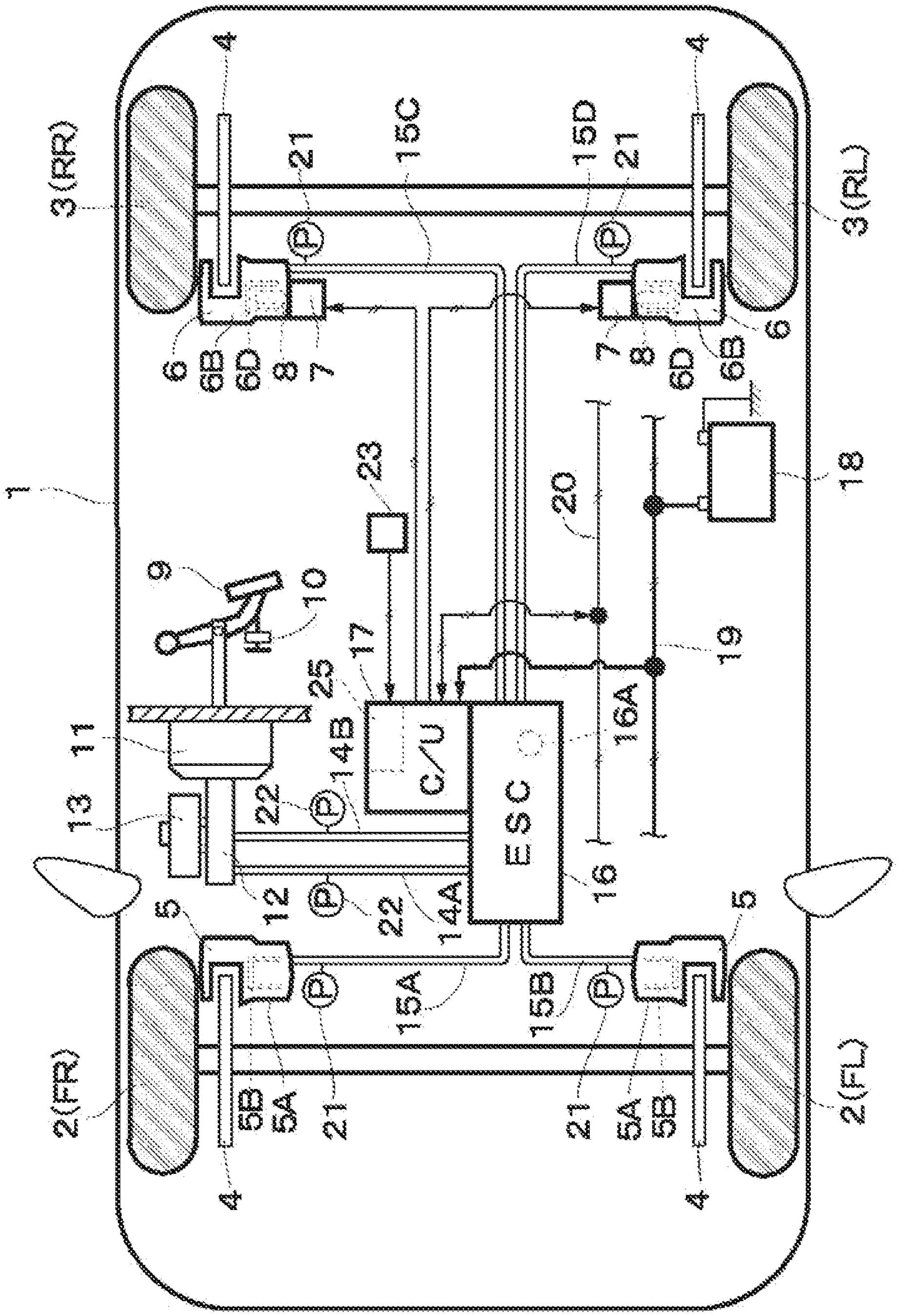
FIG. 1 is a conceptual diagram of a vehicle on which a brake apparatus according to an embodiment is mounted.

In FIG. 1, four wheels in total that include, for example, left and right front wheels 2 (FL and FR) and left and right rear wheels 3 (RL and RR) are mounted under a vehicle body 1 forming a main structure of a vehicle (on a road surface side). The wheels (each of the front wheels 2 and each of the rear wheels 3) constitute the vehicle together with the vehicle body 1. A brake system for providing a braking force is mounted on the vehicle. In the following description, the brake system of the vehicle will be described.

A disk rotor 4 is provided on each of portions where the front wheels 2 and the rear wheels 3 are mounted. The disk rotor 4 serves as a braking target member (a rotational member) that rotates together with each of the wheels (each of the front wheels 2 and each of the rear wheels 3). The disk rotor 4 for the front wheel 2 is subjected to a braking force by a front wheel-side disk brake 5, which is a hydraulic disk brake. The disk rotor 4 for the rear wheel 3 is subjected to a braking force by a rear wheel-side disk brake 6, which is a hydraulic disk brake equipped with an electric parking brake function.

Figure 2:
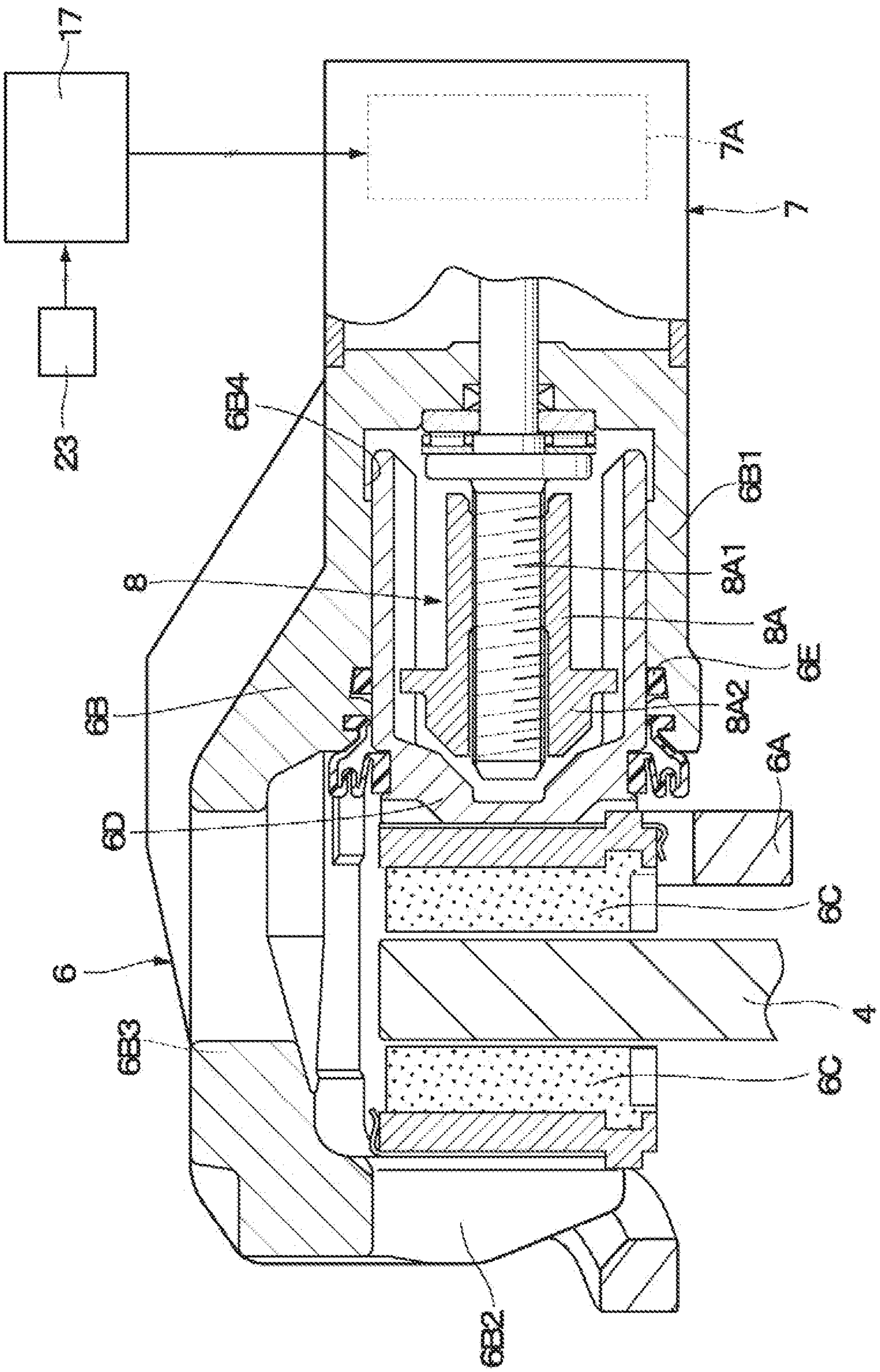
FIG. 2 is a vertical cross-sectional view illustrating a hydraulic disk brake equipped with an electric parking brake function that is mounted on a rear wheel side illustrated in FIG. 1 in an enlarged manner.

A pair (set) of rear wheel-side disk brakes 6 provided in correspondence with the left and right rear wheels 3, respectively, is each a hydraulic brake mechanism (a hydraulic brake) that provides a braking force by pressing brake pads 6C (refer to FIG. 2) against the disk rotor 4 based on a hydraulic pressure. As illustrated in FIG. 2, each of the rear wheel-side disk brakes 6 includes, for example, a mount member 6A called a carrier, a caliper 6B as a wheel cylinder, the pair of brake pads 6C as a braking member (a frictional member or a frictional pad), and a piston 6D as a pressing member. In this case, the caliper 6B and the piston 6D constitute a hydraulic mechanism (a cylinder mechanism) that provides the braking force to the vehicle by moving the piston 6D using the hydraulic pressure to press the brake pads 6C against the disk rotor 4.

The mount member 6A is fixed to anon-rotatable portion of the vehicle, and is disposed so as to extend across over the outer peripheral side of the disk rotor 4. The caliper 6B is provided on the mount member 6A movably in the axial direction of the disk 4. The caliper 6B includes a cylinder main body portion 6B1, a claw portion 6B2, and a bridge portion 6B3 connecting them. A cylinder (a cylinder hole) 6B4 is provided in the cylinder main body portion 6B1, and the piston 6D is fittedly inserted in the cylinder 6B4. The brake pads 6C are movably attached to the mount member 6A, and are disposed so as to be able to abut against the disk rotor 4. The piston 6D presses the brake pads 6C against the disk rotor 4.

Then, the caliper 6B thrusts the brake pads 6C by the piston 6D according to supply (addition) of the hydraulic pressure (a brake hydraulic pressure) into the cylinder 6B4 based on an operation on a brake pedal 9 or the like. At this time, the brake pads 6C are pressed against the both surfaces of the disk rotor 4 by the claw portion 6B2 of the caliper 6B and the piston 6D. As a result, the braking force is provided to the rear wheel 3 rotating together with the disk rotor 4.

Further, the rear wheel-side disk brake 6 includes an electric actuator 7 and a rotation-liner motion conversion mechanism 8. The electric actuator 7 includes an electric motor 7A as an electrically-driven motor, and a speed reducer (not illustrated) that slows down the rotation of this electric motor 7A. The electric motor 7A serves as a thrust source (a driving source) for thrusting the piston 6D. The rotation-linear motion conversion mechanism 8, which is a rotation-linear motion mechanism, constitutes a holding mechanism that holds the force pressing the brake pads 6C (a pressing member holding mechanism).

In this case, the rotation-linear motion conversion mechanism 8 includes a rotation-linear motion member 8A. The rotation-linear motion member 8A converts a rotation of the electric motor 7A into an axial displacement (a linear displacement) of the piston 6D and also thrusts this piston 6D. The rotation-linear motion member 8A includes, for example, a threaded member 8A1 and a linear motion member 8A2. The threaded member 8A1 is made of an externally threaded rod-like member. The linear motion member 8A2 serves as a thrust member including an internal thread hole formed on the inner peripheral side thereof. The rotation-linear motion conversion mechanism 8 converts the rotation of the electric motor 7A into the axial displacement of the piston 6D, and also holds the piston 6D thrust by the electric motor 7A. In other words, the rotation-linear motion conversion mechanism 8 provides a thrust force to the piston 6D by the electric motor 7A and thrusts the brake pads 6C by this piston 6D to press the disk rotor 4, and then holds the thrust force on this piston 6D. The rotation-linear motion conversion mechanism 8 can employ a screw mechanism or the like capable of holding the pressing state even when the electric motor 7A is powered off.

The rotation-linear motion conversion mechanism 8 constitutes a parking brake mechanism (an electric parking brake mechanism) together with the electric motor 7A. The parking brake mechanism converts the rotational force of the electric motor 7A into the thrust force via a speed reducer and the rotation-linear motion conversion mechanism 8 to thrust (displace) the piston 6D, thereby pressing the brake pads 6C against the disk rotor 4 and holding the braking force on the vehicle. The parking brake mechanism (i.e., the electric motor 7A and the rotation-linear motion conversion mechanism 8) constitutes the brake apparatus (the electric brake apparatus) together with the hydraulic mechanism (i.e., the caliper 6B and the piston 6D) and a braking control apparatus 17, which will be described below. The parking brake mechanism holds the braking force by the electric motor 7A. As will be described below, the electric motor 7A is controlled by a control portion (an arithmetic circuit 24) of the braking control apparatus 17.

The rear wheel-side disk brake 6 thrusts the piston 6D by the brake hydraulic pressure generated based on the operation on the brake pedal 9 or the like to press the disk rotor 4 with the brake pads 6C, thereby providing the braking force to the wheel (the rear wheel 3) and thus the vehicle. In addition thereto, the rear wheel-side disk brake 6 thrusts the piston 6D by the electric motor 7A via the rotation-linear motion conversion mechanism 8 according to an actuation request based on a signal from a parking brake switch 23 or the like, thereby providing a braking force (a parking brake or an auxiliary brake while the vehicle is running when necessary) to the vehicle, as will be described below.

In other words, the rear wheel-side disk brake 6 drives the electric motor 7A to thrust the piston 6D by the rotation-linear motion member 8A, thereby pressing the brake pads 6C against the disk rotor 4 and holding them. In this case, the rear wheel-side disk brake 6 thrusts the piston 6D by the electric motor 7A and holds the braking of the vehicle according to a parking brake request signal (an application request signal), which serves as an application request for providing the parking brake (the brake used to park the vehicle). Along therewith, the rear wheel-side disk brake 6 brakes the vehicle by the supply of the hydraulic pressure from a hydraulic pressure source (a master cylinder 12, which will be described below, or a hydraulic pressure supply apparatus 16 as necessary) according to the operation on the brake pedal 9.

In this manner, the rear wheel-side disk brake 6 includes the rotation-linear motion conversion mechanism 8, which presses the brake pads 6C against the disk rotor 4 by the electric motor 7A and holds the force pressing these brake pads 6C, and is also configured to be able to press the brake pads 6C against the disk rotor 4 by the hydraulic pressure added separately from the pressing by the electric motor 7A.

On the other hand, a pair (set) of front wheel-side disk brakes 5 provided in correspondence with the left and right front wheels 2, respectively, is configured in an approximately similar manner to the rear wheel-side disk brakes 6, except for the mechanism relating to the operation of the parking brake. More specifically, as illustrated in FIG. 1, each of the front wheel-side disk brakes 5 includes a mount member (not illustrated), a caliper 5A, brake pads (not illustrated), a piston 5B, and the like, but does not include the electric actuator 7 (the electric motor 7A), the rotation-linear motion conversion mechanism 8, and the like for actuating and releasing the parking brake. However, the front wheel-side disk brake 5 is similar to the rear wheel-side disk brake 6 in terms of thrusting the piston 5B by the hydraulic pressure generated based on, for example, the operation on the brake pedal 9 to provide the braking force to the wheel (the front wheel 2) and thus the vehicle. In other words, the front wheel-side disk brake 5 is a hydraulic brake mechanism (a hydraulic brake) that provides the braking force by pressing the brake pads against the disk rotor 4 by the hydraulic pressure.

The disk brake equipped with the electric parking brake function may be employed as the front wheel-side disk brake 5, similarly to the rear wheel-side disk brake 6. Alternatively, the hydraulic disk brake may be employed as the rear wheel-side disk brake, and the hydraulic disk brake equipped with the electric parking brake function may be employed as the front wheel-side disk brake. Further, in the embodiment, the hydraulic disk brake 6 including the electric motor 7A is used as the electric brake (the electric parking brake). However, the electric brake (the electric brake mechanism) is not limited thereto, and examples usable as that include an electric drum brake that provides a braking force by pressing shoes against a drum using an electric motor, a disk brake equipped with an electric drum-type parking brake, and a cable puller-type electric parking brake that actuates an application of a parking brake by pulling a cable using an electric motor. In other words, various types of electric brakes (electric brake mechanisms) can be used as the electric brake (the electric brake mechanism), as long as the electric brake is configured to be able to press (thrust) a frictional member (a pad or a shoe) against a rotational member (a rotor or a drum) based on driving of an electric motor (an electric actuator), and hold and release this pressing force.

The brake pedal 9 is provided on a dashboard side of the vehicle body 1. The brake pedal 9 is operated by being pressed by a driver (an operator) at the time of the operation of braking the vehicle. Each of the disk brakes 5 and 6 provides and releases the braking force as a regular brake (a service brake) based on the operation on the brake pedal 9. A brake operation detection sensor (a brake sensor) 10, such as a brake lamp switch, a pedal switch (a brake switch), or a pedal stroke sensor, is provided at the brake pedal 9.

The brake operation detection sensor 10 is connected to the braking control apparatus 17, which is an ECU (Electronic Control Unit). The brake operation detection sensor 10 detects presence or absence of the operation of pressing the brake pedal 9 or an operation amount thereof, and outputs a detection signal thereof to the braking control apparatus 17. The detection signal of the brake operation detection sensor 10 is transmitted via, for example, a vehicle data bus 20 (for example, is output to another control apparatus, such as a control apparatus for suspension control).

The operation of pressing the brake pedal 9 is transmitted to the master cylinder 12, which functions as an oil pressure source (a hydraulic pressure source), via a booster 11. The booster 11 is configured as a negative-pressure booster (an atmospheric-pressure booster) or an electric booster (an electrically-driven booster) provided between the brake pedal 9 and the master cylinder 12. The booster 1I powers up the pressing force and transmits it to the master cylinder 12 at the time of the operation of pressing the brake pedal 9. At this time, the master cylinder 12 generates a hydraulic pressure by brake fluid supplied (replenished) from a master reservoir 13. The master reservoir 13 is a hydraulic fluid tank that contains the brake fluid therein. The mechanism for generating the hydraulic pressure by the brake pedal 9 is not limited to the above-described configuration, and may be a mechanism that generates the hydraulic pressure according to the operation on the brake pedal 9, such as a brake-by-wire type mechanism.

The hydraulic pressure generated in the master cylinder 12 is transmitted to the hydraulic pressure supply apparatus 16 (hereinafter referred to as the ESC 16) via, for example, a pair of cylinder-side hydraulic pressure pipes 14A and 14B. The hydraulic pressure transmitted to the ESC 16 is supplied to the individual disk brakes 5 and 6 via brake-side pipe portions 15A, 15B, 15C, and 15D. The ESC 16 is disposed between each of the disk brakes 5 and 6 and the master cylinder 12. The ESC 16 distributes and supplies the hydraulic pressure output from the master cylinder 12 via the cylinder-side hydraulic pressure pipes 14A and 14B to the individual disk brakes 5 and 6 via the brake-side pipe portions 15A, 15B, 15C, and 15D.

Now, the ESC 16 is a hydraulic pressure control apparatus that controls the hydraulic pressure of the hydraulic brake (the front wheel-side disk brakes 5 and the rear wheel-side disk brakes 6). To fulfill this function, the ESC 16 includes a plurality of control valves (not illustrated), a hydraulic pressure pump that pressurizes the brake hydraulic pressure (not illustrated), an electric motor 16A that drives this hydraulic pressure pump (refer to FIG. 3), and a reservoir for controlling the hydraulic pressure that temporarily stores extra brake fluid therein (not illustrated). Each of the control valves and the electric motor 16A in the ESC 16 are connected to the braking control apparatus 17, and the ESC 16 includes the braking control apparatus 17.

The opening/closing of each of the control valves and the driving of the electric motor 16A in the ESC 16 are controlled by the braking control apparatus 17. In other words, the braking control apparatus 17 is an ESC control unit that controls the ESC 16 (an ECU for the ESC). The braking control apparatus 17 includes a microcomputer, and electrically controls the driving of the ESC 16 (a solenoid of each of the control valves and the electric motor 16A therein). In this case, for example, an arithmetic circuit 24 and an ESC driving circuit 27 are built in the braking control apparatus 17. The arithmetic circuit 24 controls the supply of the hydraulic pressure from the ESC 16 and detects a malfunction of the ESC 16. The ESC driving circuit 27 drives the electric motor 16A and each of the control valves.

As will be described below, in addition to being the control unit for the ESC (the ECU for ESC) as the ESC control apparatus that controls the ESC 16, the braking control apparatus 17 is also a control unit for the parking brake (an ECU for the parking brake) as a parking brake control apparatus that controls the rear wheel-side disk brakes 6 (the electric motors 7A thereof). In other words, in the embodiment, the ESC control apparatus (the control unit for the ESC) and the parking brake control apparatus (the control unit for the parking brake) are formed by the single braking control apparatus 17. The braking control apparatus 17 electrically controls the driving of the electric motors 7A of the rear wheel-side disk brakes 6, in addition to electrically controlling the driving of the ESC 16 (the solenoid of each of the control valves and the electric motor 16A thereof).

The braking control apparatus 17 individually controls the driving of each of the control valves (the solenoid thereof) and the electric motor 16A for the hydraulic pressure pump in the ESC 16. Due to this control, the braking control apparatus 17 performs control of reducing, maintaining, and increasing or pressurizing the brake hydraulic pressure (a wheel cylinder hydraulic pressure) to supply to each of the disk brakes 5 and 6 via the brake-side pipe portions 15A to 15D for each of the disk brakes 5 and 6 individually. In this case, the braking control apparatus 17 performs, for example, braking force distribution control, anti-lock brake control (hydraulic ABS control), vehicle stabilization control, hill start aid control, traction control, vehicle following control, traffic lane departure avoidance control, and obstacle avoidance control (automatic brake control or brake control for reducing collision damage) by controlling the actuation of the ESC 16.

The ESC 16 directly supplies the hydraulic pressure generated in the master cylinder 12 to the disk brakes 5 and 6 (the calipers 5A and 6B thereof) at the time of a normal operation in response to the brake operation performed by the driver. On the other hand, for example, the ESC 16 maintains the hydraulic pressure in the disk brake 5 or 6 by closing a control valve for a pressure increase when performing the anti-lock brake control or the like, and discharges the hydraulic pressure in the disk brake 5 or 6 so as to release it to the reservoir for controlling the hydraulic pressure by opening a control valve for a pressure reduction when reducing the hydraulic pressure in the disk brake 5 or 6. Further, when increasing or pressurizing the hydraulic pressure to supply to the disk brake 5 or 6 to perform, for example, the stabilization control (electronic stability control) when the vehicle is running, the ESC 16 actuates the hydraulic pressure pump by the electric motor 16A with a control valve for supply closed, thereby supplying the brake fluid discharged from this hydraulic pressure pump to the disk brake 5 or 6. At this time, the brake fluid in the master reservoir 13 is supplied from the master cylinder 12 side toward an intake side of the hydraulic pressure pump.

Power from a battery 18 (or a generator driven by an engine), which serves as a vehicle power source, is supplied to the braking control apparatus 17 via a power source line 19. As illustrated in FIG. 1, the braking control apparatus 17 is connected to the vehicle data bus 20. Instead of the ESC 16, a known ABS unit can also be used. Alternatively, the master cylinder 12 and the brake-side pipe portions 15A to 15D can also be directly connected to each other without the provision of the ESC 16 (i.e., with the ESC 16 omitted).

The vehicle data bus 20 constitutes a CAN (Controller Area Network) as a serial communication portion mounted on the vehicle body 1. A large number of electronic apparatuses mounted on the vehicle (for example, various kinds of ECUs including the braking control apparatus 17) carry out in-vehicle multiplex communication with one another via the vehicle data bus 20. In this case, examples of vehicle information transmitted to the vehicle data bus 20 include information (vehicle information) based on detection signals (output signals) from the brake operation detection sensor 10, an ignition switch, a safety belt sensor, a door lock sensor, a door opening sensor, a seat occupancy sensor, a vehicle speed sensor, a steering angle sensor, an accelerator sensor (an accelerator operation sensor), a throttle sensor, an engine rotation sensor, a stereo camera, a millimeter-wave radar, a slope sensor (an inclination sensor), a gearshift sensor (transmission data), an acceleration sensor (a G sensor), a wheel speed sensor, a pitch sensor that detects a motion of the vehicle in a pitch direction, and the like.

Figure 3:
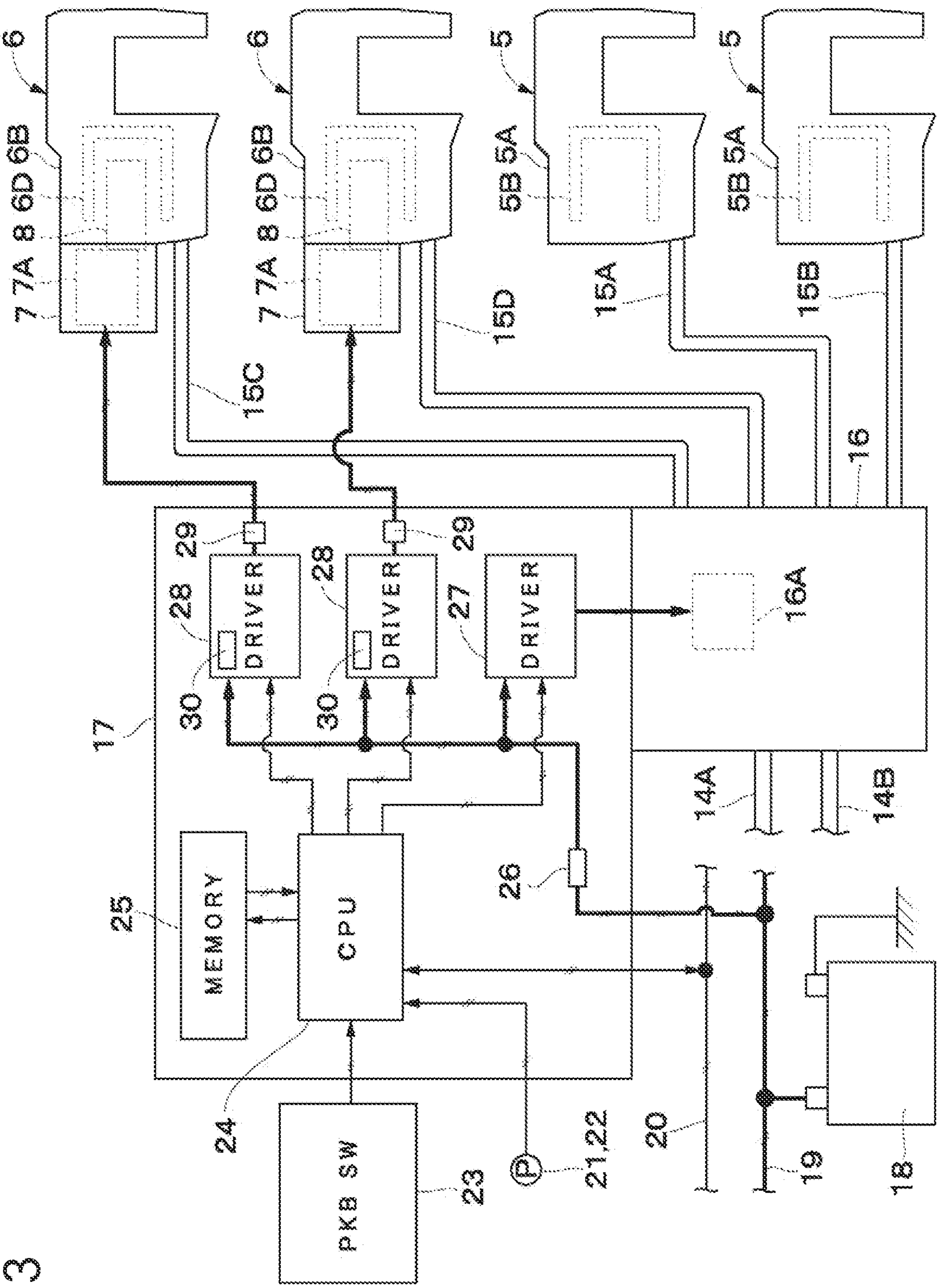

Further, the examples of the vehicle information transmitted to the vehicle data bus 20 also include a detection signal from a WC pressure sensor 21, which detects the wheel cylinder pressure (the WC pressure), and a detection signal from an MC pressure sensor 22, which detects a master cylinder pressure (an MC pressure). The embodiment is configured to include both the WC pressure sensor 21 and the MC pressure sensor 22, but, for example, the WC pressure sensor 21 may be omitted if the WC pressure can be estimated using the MC pressure sensor 22. Further, the MC pressure sensor 22 may be provided in the ESC 16, and/or the WC pressure sensor 21 may be provided in the ESC 16. As illustrated in FIG. 3, the WC pressure sensor 21 and the MC pressure sensor 22 can be directly connected to, for example, the braking control apparatus 17.

Next, the electric parking brake will be described.

The parking brake switch (PKB-SW) 23 as the switch of the electric parking brake is provided in the vehicle body 1 at a position located close to the driver's seat (not illustrated). The parking brake switch 23 is an operation instruction portion operated by the driver. The parking brake switch 23 transmits a signal (an actuation request signal) corresponding to a request to actuate the parking brake (an application request working as a holding request or a release request working as a stop request) according to an operation instruction from the driver to the parking brake control apparatus 17. In other words, the parking brake switch 23 outputs an actuation request signal (an application request signal working as a holding request signal or a release request signal working as a stop request signal) for actuating the piston 6D and thus the brake pads 6C for the application (holding actuation) or for the release (release actuation) based on the driving (the rotation) of the electric motor 7A to the parking brake control apparatus 17. A signal input via the vehicle data bus 20 serving as a communication line, such as accelerator pedal operation information, may be used as the actuation request signal for the parking brake.

When the parking brake switch 23 is operated by the driver toward a braking side (an application side), i.e., when the application request for providing the braking force to the vehicle (the braking holding request) is issued, the application request signal (the parking brake request signal or an application instruction) is output from the parking brake switch 23. In this case, the electric motor 7A of the rear wheel-side disk brake 6 receives supply of power for rotating this electric motor 7A toward the braking side via the braking control apparatus 17. At this time, the rotation-linear motion conversion mechanism 8 thrusts (presses) the piston 6D toward the disk rotor 4 side based on the rotation of the electric motor 7A, and holds the thrust piston 6D. As a result, the rear wheel-side disk brake 6 is brought into a state that the braking force as the parking brake (or the auxiliary brake) is provided thereto, i.e., an application state (a braking holding state).

On the other hand, when the parking brake switch 23 is operated by the driver toward a braking release side (a release side), i.e., when the release request for releasing the braking force on the vehicle (the braking release request) is issued, the release request signal (a parking brake release request signal or a release instruction) is output from the parking brake switch 23. In this case, the electric motor 7A of the rear wheel-side disk brake 6 receives supply of power for rotating this electric motor 7A in the opposite direction from the braking side via the braking control apparatus 17. At this time, the rotation linear-motion conversion mechanism 8 releases the holding of the piston 6D (releases the pressing force generated by the piston 6D) by the rotation of the electric motor 7A. As a result, the rear wheel-side disk brake 6 is brought into a state that the application of the braking force as the parking brake (or the auxiliary brake) is released, i.e., a release state (a braking release state).

The braking control apparatus 17 as the control apparatus (the electric brake control apparatus) constitutes the brake apparatus (the electric brake apparatus) together with the rear wheel-side disk brake 6 (the caliper 6B, the piston 6D, the electric motor 7A, and the rotation-linear motion conversion mechanism 8 thereof). The braking control apparatus 17 controls the driving of the electric motor 7A. To fulfill this function, the braking control apparatus 17 includes the arithmetic circuit (CPU) 24 constituted by the microcomputer or the like and a memory 25, as illustrated in FIG. 3. Power from the battery 18 (or the generator driven by the engine) is supplied to the braking control apparatus 17 via the power source line 19. For example, the arithmetic circuit 24 can be configured as a dual-core unit (a dual-circuit unit) that performs the same processing in parallel and also mutually monitors whether there is a difference between the processing results. In this case, even when a malfunction has occurred in one of the cores (the circuits), the control can continue (can be backed up) by the other of the cores (the circuits). Alternatively, the braking control apparatus 17 may be configured to include two arithmetic circuits, i.e., an arithmetic circuit for the ESC and an arithmetic circuit for the electric parking brake, although this configuration is not illustrated herein.

As described above, the braking control apparatus 17 controls the opening/closing of each of the control valves and the driving of the electric motor 16A in the ESC 16, thereby reducing, maintaining, or increasing or pressurizing the brake hydraulic pressure to supply to each of the disk brakes 5 and 6. In addition thereto, the braking control apparatus 17 controls the driving of the electric motors 7A and 7A of the rear wheel-side disk brakes 6 and 6, thereby generating the braking force (the parking brake or the auxiliary brake) when the vehicle is parked or stopped (or is running when necessary). In other words, the braking control apparatus 17 actuates (applies or releases) the disk brakes 6 and 6 as the parking brake (the auxiliary brake when necessary) by driving the left and right electric motors 7A and 7A. To fulfill this function, the input side of the braking control apparatus 17 is connected to the parking brake switch 23, and the output side thereof is connected to the respective electric motors 7A and 7A of the disk brakes 6 and 6.

The braking control apparatus 17 includes the arithmetic circuit 24, the ESC driving circuit 27, and motor driving circuits 28 and 28 built therein. The arithmetic circuit 24 is used to control the supply of the hydraulic pressure of the ESC 16 and the application/release of the electric parking brake. The ESC driving circuit 27 is used to control, for example, the electric motor 16A of the ESC 16. The motor driving circuits 28 and 28 are used to control the electric motors 7A and 7A of the electric parking brakes.

The braking control apparatus 17 drives the left and right electric motors 7A and 7A to apply (hold) or release (stop) the left and right disk brakes 6 and 6 based on the actuation request (the application request or the release request) according to the operation performed on the parking brake switch 23 by the driver, an actuation request according to a determination of an automatic application/automatic release of the parking brake, or the like. At this time, the rear wheel-side disk brake 6 holds or releases the piston 6D and the brake pads 6C by the rotation-linear motion conversion mechanism 8 based on the driving of each of the electric motors 7A. In this manner, the braking control apparatus 17 controls the driving of the electric motor 7A so as to thrust the piston 6D (and thus the brake pads 6C) according to the actuation request signal for the holding actuation (the application) or the release actuation (the release) of the piston 6D (and thus the brake pads 6C).

As illustrated in FIG. 3, the parking brake switch 23, the vehicle data bus 20, voltage sensor portions 26, 30, and 30, the ESC driving circuit 27, the motor driving circuits 28 and 28, current sensor portions 29 and 29, and the like, in addition to the memory 25 as a storage portion, are connected to the arithmetic circuit 24 of the braking control apparatus 17. Various kinds of state amounts of the vehicle that are required to control the ESC 16 and control (actuate) the parking brake, i.e., various kinds of vehicle information can be acquired from the vehicle data bus 20. Further, the braking control apparatus 17 can output information and instructions to various kinds of ECUs via the vehicle data bus 20.

The braking control apparatus 17 may be configured in such a manner that the vehicle information acquired from the vehicle data bus 20 is acquired by connecting a sensor that detects this information directly to the braking control apparatus 17 (the arithmetic circuit 24 thereof). Alternatively, the arithmetic circuit 24 of the braking control apparatus 17 may be configured in such a manner that the actuation request based on the determination of the automatic application/automatic release is input from another control apparatus (ECU) connected to the vehicle data bus 20. In this case, the vehicle can be configured in such a manner that the other control apparatus controls the determination of the automatic application/automatic release, instead of the braking control apparatus 17.

The braking control apparatus 17 includes the memory 25 as the storage portion embodied by, for example, a flash memory, a ROM, a RAM, or an EEPROM. The memory 25 stores therein a processing program used for the control of the ESC 16 and a processing program used for the control of the parking brake. In this case, the memory 25 stores therein, for example, a processing program for performing processing flows illustrated in FIGS. 5 to 8, which will be described below, and the relationship between an application completion threshold value and the WC pressure (a map or a table) illustrated in FIG. 9. Further, in the embodiment, an EEPROM as a nonvolatile memory is provided as the memory 25. The nonvolatile memory stores therein various kinds of information and various kinds of signals used at the time of the application and at the time of the release. A flash memory may be used as the nonvolatile memory storing the various kinds of information and the various kinds of signals therein.

In the embodiment, the ESC control apparatus, which controls the ESC 16 (the electric motor 16A and each of the control valves), and the parking brake control apparatus, which controls the parking brake (the electric motors 7A and 7A), are constituted by the single braking control apparatus 17. However, the configuration is not limited thereto, and, for example, the ESC control apparatus and the parking brake control apparatus may be configured as individual separate apparatuses from each other. Further, the braking control apparatus 17 is configured to control the two left and right rear-side disk brakes 6 and 6, but the parking brake control apparatus may be provided for each of the left and right rear-side disk brakes 6 and 6 along with the ESC control apparatus and the parking brake control apparatus configured as individual separate apparatuses. In this case, each of the parking brake control apparatuses can also be provided integrally with the rear-side disk brake 6. Further, the braking control apparatus, the ESC control apparatus, or the parking brake control apparatus may be configured integrally with a control apparatus that controls a function other than braking (various kinds of ECUs other than the braking ECU, such as a control apparatus for power steering).

As illustrated in FIG. 3, the braking control apparatus 17 includes the power source voltage sensor portion 26, the ESC driving circuit 27, the left and right motor driving circuits 28 and 28, the left and right current sensor portions 29 and 29, the left and right voltage sensor portions 30 and 30, and the like, which are built therein. The power source voltage sensor portion 26 detects a voltage fed from the power source line 19. The ESC driving circuit 27 drives each of the control valves (the solenoid thereof) and the electric motor 16A in the ESC 16. The left and right motor driving circuits 28 and 28 drive the left and right electric motors 7A and 7A of the parking brakes, respectively. The left and right current sensor portions 29 and 29 detect respective motor currents of the left and right electric motors 7A and 7A. The left and right voltage sensor portions 30 and 30 detect respective motor voltages (voltages between terminals) in the left and right electric motors 7A and 7BA.

The power source voltage sensor portion 26, the ESC driving circuit 27, the left and right motor driving circuits 28 and 28, the left and right current sensor portions 29 and 29, and the left and right voltage sensor portions 30 and 30 are each connected to the arithmetic circuit 24. The braking control apparatus 17 (the arithmetic circuit 24) monitors (checks) the voltages supplied to the electric motors 7A and the currents flowing therein by the current sensor portions 29 and 29 and the voltage sensor portions 30 and 30. The motor driving circuits 28 can switch the power supply to the electric motors 7A to ON (application or release)/OFF/shorting.

The braking control apparatus 17 (the arithmetic circuit 24) can, for example, determine a stop of the driving of the electric motors 7A and 7A (the completion of the application or the completion of the release) based on, for example, the current values (the monitored current values) of the electric motors 7A and 7A that are detected by the current sensor portions 29 and 29 when applying or releasing the parking brake. The illustrated example is provided with both the "power source voltage sensor portion 26 that detects the voltage of the power source line 19" and the "left and right voltage sensor portions 30 and 30 that detect the voltages between terminals in the left and right electric motors 7A and 7A", but any one of them may be omitted.

Figure 12:
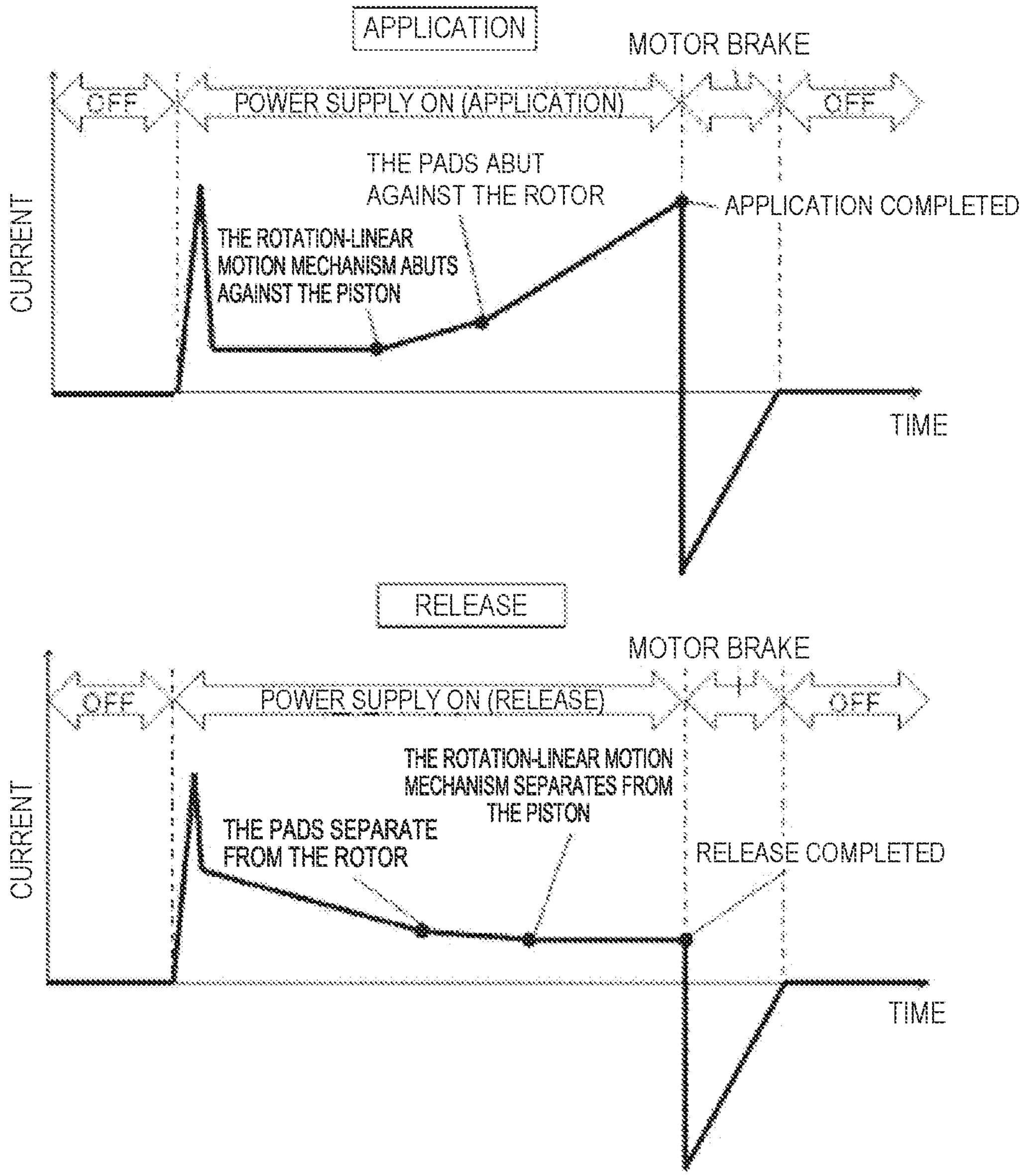
FIG. 12 is a characteristic line diagram illustrating one example of a change over time in each of currents at the time of an application and at the time of a release.

FIG. 12 illustrates an overview of a basic operation of the electric parking brake, i.e., one example of changes over time in the currents at the time of the application and at the time of the release. The braking control apparatus 17 (the arithmetic circuit 24) conducts the application, the release, or the motor brake by setting the power supply to the electric motor 7A to ON/OFF/shorting by each of the motor driving circuits 28 and 28 according to, for example, an operation performed by the driver (the operator). Both the current waveforms during the application and the release in FIG. 12 indicate examples in which no hydraulic fluid is added (the brake pedal is not pressed). Further, basically, the current and the generated thrust force are proportional to each other.

For example, at the time of the application, the electric parking brake functions in the following manner according to an operation of setting the power supply to ON. That is, an inrush current flows according to the driving of the electric motor 7A, and, after that, a current required to cause the rotation-linear motion conversion mechanism 8 to operate (thrust the linear motion member 8A2 to the piston 6D side) flows until the rotation-linear motion conversion mechanism 8 abuts against the piston 6D. A load increases due to the abutment of the rotation-linear motion conversion mechanism 8 (the linear motion member 8A2) against the piston 6D, and the load further increases due to the abutment of the brake pads 6C against the disk rotor 4 and the current also increases (the gradient of the current increases) according to the stiffness of the brake pads 6C and the disk rotor 4. The braking control apparatus 17 determines that a braking force required to stop the vehicle is generated based on an increase in the current by a predetermined or higher degree (for example, the current reaches a preset current value), and completes the application.

On the other hand, at the time of the release, the electric parking brake functions in the following manner according to an operation of setting the power supply to ON. The load applied to the rotation-linear motion conversion mechanism 8 reduces and the current reduces due to the separation of the brake pads 6C from the disk rotor 4. The load further reduces due to the separation of the rotation-linear motion conversion mechanism 8 from the piston 6D, and the current reduces to the value required to cause the rotation-linear motion conversion mechanism 8 to operate. The release is completed after the rotation-linear motion conversion mechanism 8 (the linear motion member 8A2) separates from the piston 6D and a predetermined or larger clearance is secured.

Further, the electric parking brake functions in the following manner according to a shorting operation. When the application or the release is completed, a torque in a direction for stopping the electric motor 7A (the motor brake) is generated by causing the motor driving circuit 28 to short the motor terminals therebetween (a motor brake state) and generating a current in an opposite direction with the aid of an inductive voltage. The completion of the application and the completion of the release are determined using the current in the embodiment, but may be determined using a thrust force sensor or a stroke sensor. However, using the current is preferable in terms of a cost reduction.

Then, supposing that the "member pressed by the hydraulic pressure generated due to the driver's pressing the brake pedal" and the "member pressed by the parking brake mechanism (hereinafter also referred to as the PKB mechanism) are the same member (for example, the same piston), the following consequence may arise. In this case, when the PKB mechanism operates while the brake pedal is pressed, the hydraulic amount (the hydraulic pressure) in the wheel cylinder changes according to the advancement of the piston due to the operation of the PKB mechanism, and this change is transmitted to the brake pedal. As a result, the driver may sense a change in the pedal reaction force (a brake pedal reaction force), and feel uncomfortable.

On the other hand, the above-described technique of PTL 1 calculates a stroke amount by which the piston is advanced by the PKB mechanism based on a change in the current when the PKB mechanism is actuated, and calculates a change in the hydraulic pressure based on the calculated stroke. After that, the technique of PTL 1 causes a stroke of a booster piston of the electric booster by an amount corresponding to the calculated change in the hydraulic pressure, thereby keeping the pedal reaction force constant and suppressing the driver's uncomfortable feeling. In other words, the technique of PTL 1 suppresses the change in the hydraulic pressure due to the actuation of the PKB mechanism using the booster piston of the electric booster.

However, the technique of PTL 1 uses the electric booster to compensate for the change in the hydraulic pressure corresponding to the distance by which the piston is advanced by the PKB mechanism, thereby raising a possibility of failing to suppress the driver's uncomfortable feeling in the case where a nonelectric booster such as a negative-pressure booster is used. Another conceivable method is, for example, to suppress the change in the hydraulic pressure using an ESC (a hydraulic pressure supply apparatus), but, in this case, the pressure is increased by the pump in the ESC, and therefore the noise and vibration performance may be deteriorated. Further, even if the system is configured to use an electric booster, a current flowing in the PKB mechanism should be input to the electric booster, and therefore the system configuration may be complicated.

Figure 13:
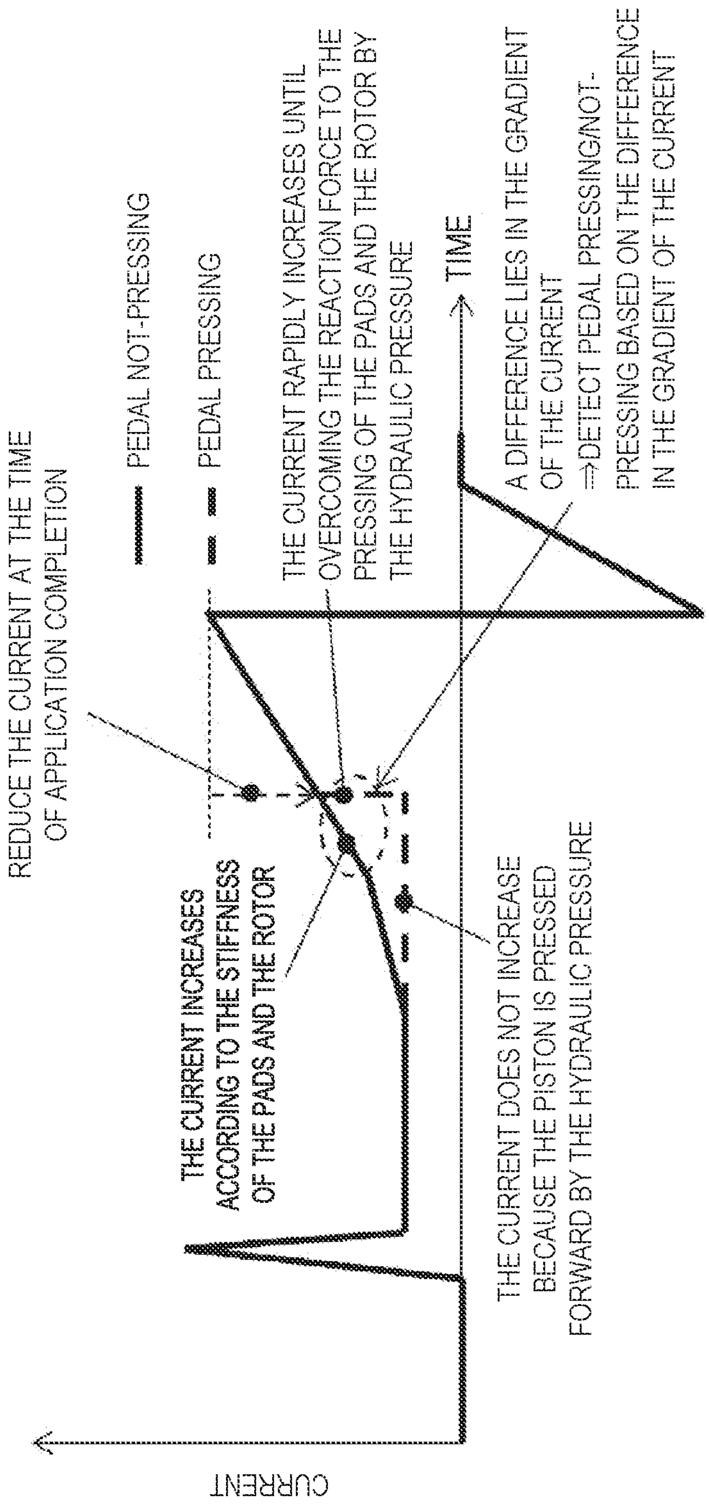
FIG. 13 is a characteristic line diagram illustrating a change over time in each of currents at the time of the application in a case of "pedal pressing" and in a case of "pedal not-pressing".

In light thereof, in the embodiment, the brake control apparatus 17 detects that the driver presses the pedal based on a change in the gradient of the current when the linear motion member 8A2 of the PKB mechanism and the piston 6D abut against each other. Then, when detecting that the driver presses the pedal, the brake control apparatus 17 reduces a current value for completing the application operation. FIG. 13 illustrates a change over time in each of currents at the time of the application in a case of "pedal not-pressing" and in a case of "pedal pressing". A solid line in FIG. 13 corresponds to a change over time in the current when the piston 6D is not advanced by the hydraulic pressure (in the case of "pedal not-pressing"). A broken line in FIG. 13 corresponds to a change over time in the current when the piston 6D is advanced by the hydraulic pressure (in the case of "pedal pressing").

As indicated by the solid line in FIG. 13, when the piston 6D is not advanced by the hydraulic pressure, the current increases according to the stiffness of the brake pads 6C and the disk rotor 4 as the piston 6D is pressed forward and the brake pads 6C and the disk rotor 4 abut against and press each other. On the other hand, as indicated by the broken line in FIG. 13, when the piston 6D is advanced by the hydraulic pressure, the brake pads 6C and the disk rotor 4 are also in abutment with each other when the linear motion member 8A2 of the PKB mechanism and the piston 6D abut against each other, and therefore the current rapidly increases until overcoming a reaction force to the pressing of the brake pads 6C and the disk rotor 4 by the hydraulic pressure. Therefore, the gradient of the change in the current when the current starts increasing varies depending on whether the pedal is pressed.

In light thereof, in the embodiment, the brake control apparatus 17 determines whether the pedal is pressed based on a difference in the gradient of the change in the current. Then, if determining that the pedal is pressed, the brake control apparatus 17 makes the current for completing the application smaller compared to when the pedal is not pressed. Because the vehicle is stopped (parked) according to the driver's pressing of the pedal at this time, the brake control apparatus 17 can both keep the vehicle stopped by the PKB mechanism and suppress the uncomfortable feeling due to the change in the pedal reaction force by reducing the current for completing the application when determining that the pedal is pressed. In other words, in the embodiment, the brake control apparatus 17 can suppress the uncomfortable feeling due to the change in the pedal reaction force when the PKB mechanism is actuated in the state that the pedal is pressed by the driver. Further, the system configuration can be simplified because the unconformable feeling can be suppressed only by the PKB mechanism, and the cost of the overall system can be cut down because only the PKB mechanism is present as an electrically controllable product (an electric control apparatus).

In the following description, the braking control apparatus 17 according to the embodiment, more specifically, a portion in the braking control apparatus 17 that performs processing relating the control of the electric brake (the electric motor 7A) (hereinafter, this portion will be referred to as a parking brake control apparatus 31) will be described with reference to FIGS. 4 to 11.

Figure 4:
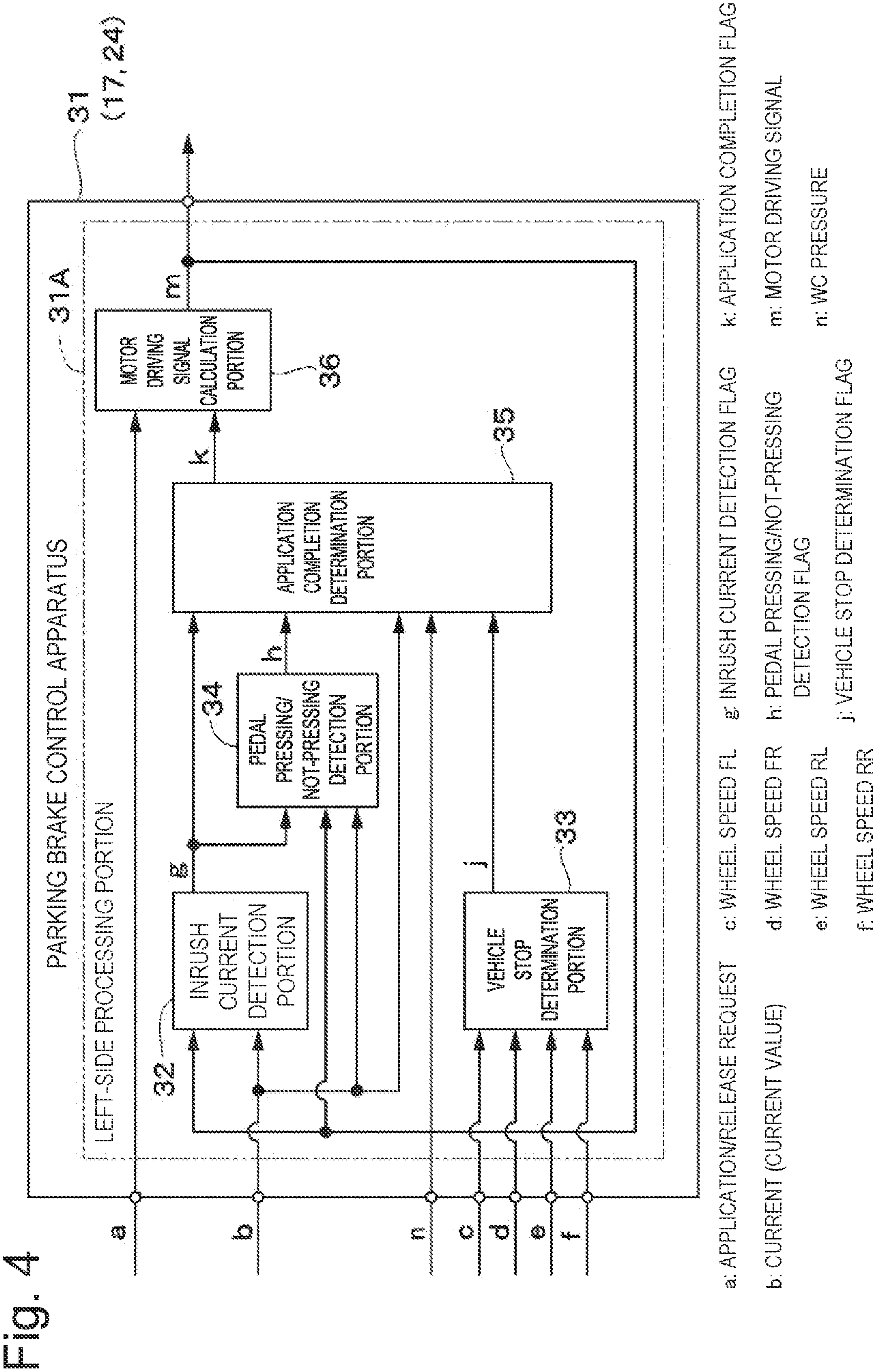
FIG. 4 is a block diagram (a control block diagram) illustrating the control apparatus illustrated in FIG. 3.

The parking brake control apparatus 31 as the electric brake control apparatus constitutes a part of the braking control apparatus 17. As illustrated in FIG. 4, the parking brake control apparatus 31 includes a left-side control portion 31A and a right-side control portion (not illustrated). The left-side control portion 31A performs processing relating to the electric motor 7A located on the left side of the vehicle body 1. The right-side control portion performs processing relating to the electric motor 7A located on the right side of the vehicle body 1. The left-side control portion 31A and the right-side control portion are similarly configured except for the difference that they are the left side and the right side, and therefore will be described in the following description mainly focusing on the left-side control portion 31A and omitting the description and the illustration of the right-side control portion.

FIG. 4 illustrates the overall control configuration according to the embodiment. The control configuration includes five control blocks (an inrush current detection portion 32, a vehicle stop determination portion 33, a pedal pressing/not-pressing detection portion 34, an application completion portion 35, and a motor driving signal calculation portion 36).

The same control is performed on the left side and the right side although this is not illustrated. However, driving the electric motors 7A and 7A on the left side and the right side at the same time leads to the generation of a considerable electric load, and therefore the electric motors 7A and 7A are preferably driven at timings different between the left side and the right side. In other words, the timings of starting driving the electric motors 7A and 7A are preferably desynchronized (for example, desynchronized by approximately several tens of milliseconds) between the left side and the right side to prevent a voltage drop due to an overlap of the inrush currents on the left side and the right side.

As illustrated in FIG. 4, the parking brake control apparatus 31 (the left-side control portion 31A and the right-side control portion) includes the inrush current detection portion 32, the vehicle stop determination portion 33, the pedal pressing/not-pressing detection portion 34, the application completion determination portion 35, and the motor driving signal calculation portion 36. The processing is performed every predetermined control cycle, such as a cycle of 10 ms in each block in the present control configuration. The parking brake control apparatus 31 determines whether it is appropriate to determine the completion of the application by the inrush current detection portion 32, the vehicle stop determination portion 33, and the pedal pressing/not-pressing detection portion 34. Further, the parking brake control apparatus 31 determines whether it is appropriate to complete the application based on a determination about the current in the application completion determination portion 35. The motor driving signal calculation portion 36 calculates an instruction value (a motor driving signal) directed to the motor driving circuit 28 based on results of these determinations. In the following description, specific processing performed by each control block will be described.

The "motor driving signal from the motor driving signal calculation portion 36" and the "signal (sensor signal) corresponding to the current (the monitored current) from the current sensor portion 29" are input to the inrush current detection portion 32. The inrush current detection portion 32 detects an inrush current based on the motor driving signal and the current (the current value) and outputs an inrush current detection flag (ON/OFF), which is a result of this detection, to the pedal pressing/not-pressing detection portion 34 and the application completion determination portion 35. The inrush current detection portion 32 detects the inrush current so as to prevent a pedal pressing/not-pressing detection flag, which will be described below, from being switched to ON in reaction to a current when the electric motor 7A is started up.

In other words, the inrush current detection portion 32 detects an inrush current immediately after the application starts. In this case, the inrush current detection portion 32 keeps the inrush current detection flag set to OFF while the application is ongoing and until a predetermined time has elapsed with the current kept in a state of being lower than the previous value before the inrush current is detected. On the other hand, the inrush current detection portion 32 sets the inrush current detection flag to ON when the application is ongoing and the predetermined time has elapsed with the current kept in the state of being lower than the previous value before the inrush current is detected. Then, after setting the inrush current detection flag to ON, the inrush current detection portion 32 maintains the ON state while the motor driving signal (the previous value) is "application", and switches the inrush current detection flag to OFF when the motor driving signal (the previous value) transitions from "application".

Figure 5:
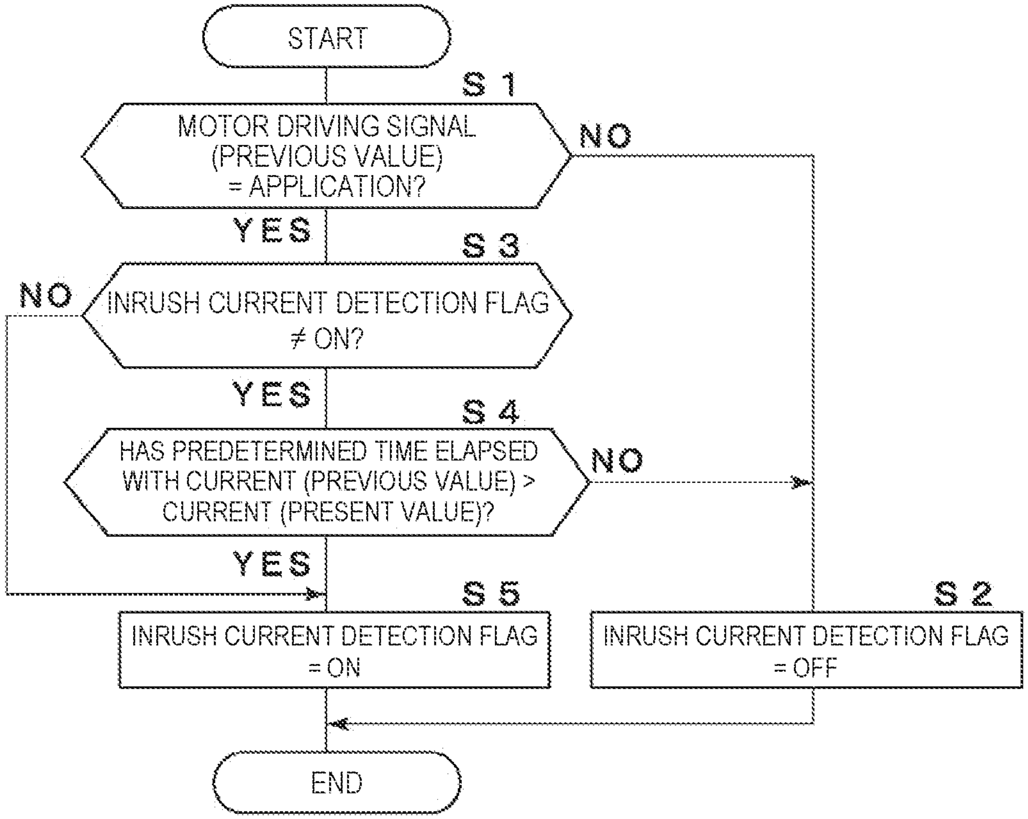
FIG. 5 is a flowchart illustrating processing performed by an inrush current detection portion illustrated in FIG. 4 (inrush current detection processing).

FIG. 5 illustrates processing for calculating the inrush current that is performed by the inrush current detection portion 32. The processing illustrated in FIG. 5 is repeatedly performed every predetermined control cycle (for example, 10 ms). After the processing illustrated in FIG. 5 is started, in S1, the inrush current detection portion 32 determines whether the motor driving signal (the previous value) corresponding to the motor diving state is the application. The motor driving signal (the previous value) is input from the motor driving signal calculation portion 36 to the inrush current detection portion 32. If "NO" is determined in S1, i.e., the motor driving signal (the previous value) is determined not to be the application, the processing proceeds to S2. In S2, the inrush current detection flag is set to "OFF". "OFF" corresponds to a state that "the inrush current is not detected". After the inrush current detection flag is set to "OFF" in S2, the processing proceeds to END.

On the other hand, if "YES" is determined in S1, i.e., the motor driving signal (the previous value) is determined to be the application, the processing proceeds to S3. In S3, the inrush current detection portion 32 determines whether the inrush current detection flag is other than "ON". In other words, in S3, the inrush current detection portion 32 determines whether the inrush current detection flag is "OFF". If "YES" is determined in S3, i.e., the inrush current detection flag is determined to be other than "ON" (determined to be "OFF"), the processing proceeds to S4. If "NO" is determined in S3, i.e., the inrush current detection flag is determined to be "ON" (determined not to be "OFF"), the processing proceeds to S5.

In S4, the inrush current detection portion 32 compares the present value, which is the current value in the present control cycle, and the previous value, which is the current value in the previous control cycle. More specifically, the inrush current detection portion 32 determines whether a predetermined time has elapsed with the present value of the current kept in a state of being lower than the previous value.

The "predetermined time" can be set as a time that allows the inrush current (more specifically, a reduction in the current after the peak of the inrush current) to be correctly detected based on the comparison between the present current value and the previous current value. The current value is input from the current sensor portion 29 to the inrush current detection portion 32. If "NO" is determined in S4, i.e., it is determined that the predetermined time has not elapsed with the present value of the current kept in the state of being lower than the previous value, the processing proceeds to S2.

On the other hand, if "YES" is determined in S4, i.e., it is determined that the predetermined time has elapsed with the present value of the current kept in the state of being lower than the previous value, the processing proceeds to S5. In S5, the inrush current detection flag is set to "ON". "ON" corresponds to a state that "the inrush current is detected". After the inrush current detection flag is set to "ON" in S5, the processing proceeds to END. The inrush current can also be detected based on the gradient of an increase in the current immediately after the application starts. However, at the time of the application, the piston is pressed forward by the rotation-linear motion mechanism, and the pads and the rotor are pressed. In other words, at the time of the application, a load on the electric motor 7A increases and the current gradually increases. Therefore, if the inrush current is detected in the gradient of an increase in the current, pedal pressing, which will be described below, may be erroneously detected immediately after the inrush current is detected. Therefore, in S4, the inrush current is detected in the gradient of a reduction in the current after the inrush current to prevent the erroneous detection.

Next, the vehicle stop determination portion 33 will be described. As illustrated in FIG. 4, the wheel speeds detected by the wheel speed sensors are input to the vehicle stop determination portion 33 via, for example, the vehicle data bus 20. The wheel speed sensors are provided in correspondence with the left and right front wheels 2 (FL and FR) and the left and right rear wheels 3 (RL and RR), respectively, and detect the wheel speeds of the corresponding wheels 2 and 3, respectively. The vehicle stop determination portion 33 determines whether the vehicle is stopped based on the respective wheel speeds of the wheels 2 and 3, and outputs a vehicle stop determination flag (ON/OFF), which is a result of this determination, to the application completion determination portion 35. The vehicle stop determination portion 33 determines whether the vehicle is stopped to prioritize a safe stop of the vehicle over reducing the uncomfortable feeling for the driver when a request to actuate the PKB mechanism (the application request) is issued without the vehicle stopped.

The vehicle stop determination portion 33 determines that the vehicle is stopped if none of the wheel speeds of the four wheels are an Invalid value (an inappropriate value) and a predetermined time has elapsed with the wheel speeds kept in a zero state. In other words, if the predetermined time has elapsed with all of the wheel speeds of the four wheels kept in the zero state, the vehicle stop determination portion 33 determines that the vehicle is stopped and sets the vehicle stop determination flag to ON. If even a single wheel has a wheel speed other than zero or before the predetermined time has elapsed with all of the wheel speeds kept in the zero state, the vehicle stop determination portion 33 determines that the vehicle is running and sets the vehicle stop determination flag to OFF. Further, if even a single wheel has a wheel speed of an Invalid value, the vehicle stop determination portion 33 sets the vehicle stop determination flag to OFF because being unable to determine whether the vehicle is stopped.

Figure 6:
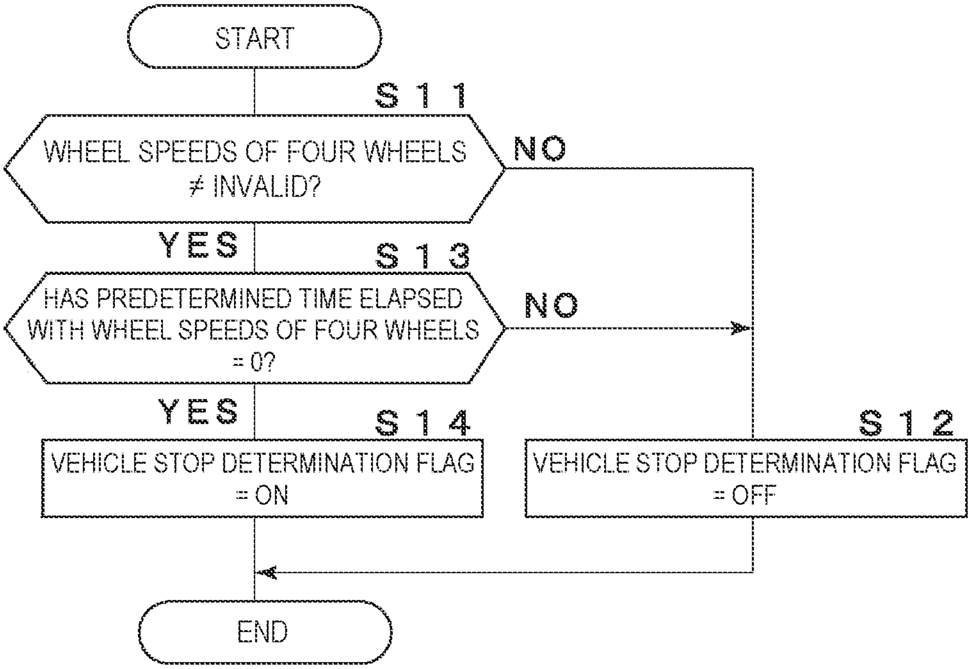
FIG. 6 is a flowchart illustrating processing performed by a vehicle stop determination portion illustrated in FIG. 4 (vehicle stop determination processing).

FIG. 6 illustrates processing for determining the vehicle stop that is performed by the vehicle stop determination portion 33. The processing illustrated in FIG. 6 is repeatedly performed every predetermined control cycle (for example, 10 ms). After the processing illustrated in FIG. 6 is started, in S11, the vehicle stop determination portion 33 determines whether all of the wheel speeds of the four wheels are a value other than an Invalid value (an inappropriate value). The Invalid value (the inappropriate value) corresponds to, for example, a value that deviates from a value under a normal condition, a value when the wheel speed cannot be normally acquired due to a malfunction of the wheel speed sensor, or the like. If "NO" is determined in S11, i.e., at least any wheel speed among the wheel speeds of the four wheels is determined to be an Invalid value (an inappropriate value), the processing proceeds to S12. In S12, the vehicle stop determination flag is set to "OFF". "OFF" corresponds to a state that "the vehicle is not stopped (the vehicle is running) ". After the vehicle stop determination flag is set to "OFF" in S12, the processing proceeds to END.

On the other hand, if "YES" is determined in S11, i.e., it is determined that none of the wheel speeds of the four wheels are an Invalid value (an inappropriate value), the processing proceeds to S13. In S13, the vehicle stop determination portion 33 determines whether a predetermined time has elapsed with all of the wheel speeds of the four wheels kept in the zero state. The "predetermined time" can be set as a time that allows the vehicle to be correctly determined to be stopped based on the wheel speeds of the four wheels. If "NO" is determined in S13, i.e., it is determined that the predetermined time has not elapsed with all of the wheel speeds of the four wheels kept in the zero state, the processing proceeds to S12. On the other hand, if "YES" is determined in S13, i.e., it is determined that the predetermined time has elapsed with all of the wheel speeds of the four wheels kept in the zero state, the processing proceeds to S14.

In S14, the vehicle stop determination flag is set to "ON". "ON" corresponds to a state that "the vehicle is stopped (the vehicle is parked)". After the vehicle stop determination flag is set to "ON" in S14, the processing proceeds to END. Whether the vehicle is stopped may be determined using, for example, a wheel speed of a wheel equipped with the PKB mechanism (for example, the wheel 3) or an average value of the wheel speeds. However, it is desirable to use the wheel speeds of the four wheels to prevent an erroneous determination when a wheel is locked. Alternatively, whether the vehicle is stopped may be determined using a wheel speed pulse instead of the wheel speed.

Next, the pedal pressing/not-pressing detection portion 34 will be described. As illustrated in FIG. 4, the "inrush current detection flag from the inrush current detection portion 32", the "motor driving signal from the motor driving signal calculation portion 36", and the "signal (sensor signal) corresponding to the current (the monitored current) from the current sensor portion 29" are input to the pedal pressing/not-pressing detection portion 34. The pedal pressing/not-pressing detection portion 34 detects the pedal pressing/not-pressing, i.e., whether the brake pedal 9 is pressed based on the inrush current detection flag, the motor driving signal, and the current (the current value), and outputs a pedal pressing/not-pressing detection flag (ON/OFF), which is a result of this detection, to the application completion determination portion 35. The pedal pressing/ not-pressing detection portion 34 detects the pedal pressing/not-pressing based on a difference between a "gradient of the current when the piston 6D is advanced by the hydraulic pressure generated due to the pedal pressing and presses the brake pads 6C and the disk rotor 4" and a "gradient of the current when the piston 6D is advanced by the PKB mechanism and presses the brake pads 6C and the disk rotor 4".

The pedal pressing/not-pressing detection portion 34 determines the pedal pressing/not-pressing based on the gradient of the current during a predetermined time after the inrush current is detected. In other words, the pedal pressing/not-pressing detection portion 34 detects whether the brake pedal 9 is pressed (the pedal pressing/not-pressing) using the gradient of an increase in the current when the brake pads 6C and the disk rotor 4 are pressed after the inrush current is detected. The pedal pressing/not-pressing detection portion 34 calculates the inclination of the current, i.e., the gradient of the current with respect to the current during the application and since the detection of the inrush current before the detection of the pedal pressing, and sets the pedal pressing/not-pressing detection flag to ON if the gradient of the current is greater than a threshold value.

On the other hand, if the inclination of the change in the current (the gradient of the current) is equal to or smaller than the threshold value, the pedal pressing/not-pressing detection portion 34 sets the pedal pressing/not-pressing detection flag to OFF. When the inrush current detection flag is OFF, the pedal pressing/not-pressing detection portion 34 sets the pedal pressing/not-pressing detection flag to OFF to prevent an erroneous determination. After being set to ON, the pedal pressing/not-pressing detection flag is kept in the ON state while the motor driving signal (the previous value) is "application", and is switched to OFF when the motor driving signal (the previous value) transitions from "application".

Now, the threshold value for the gradient of the current will be described. When the brake pedal 9 is not pressed, the current increases according to the stiffness when the brake pads 6C are pressed against the disk rotor 4. On the other hand, when the brake pedal 9 is pressed, the brake pads 6C are pressed against the disk rotor 4 by the hydraulic pressure, and therefore the current rapidly increases until overcoming the reaction force to the pressing force derived from the hydraulic pressure. Therefore, the threshold value for the gradient of the current, i.e., the threshold value for determining whether the brake pedal 9 is pressed can be set to a gradient of the current corresponding to the highest stiffness of the brake pads 6C and the disk rotor 4 with, for example, a variation in the components, the temperature, and the pad wear amount taken into consideration.

Figure 7:
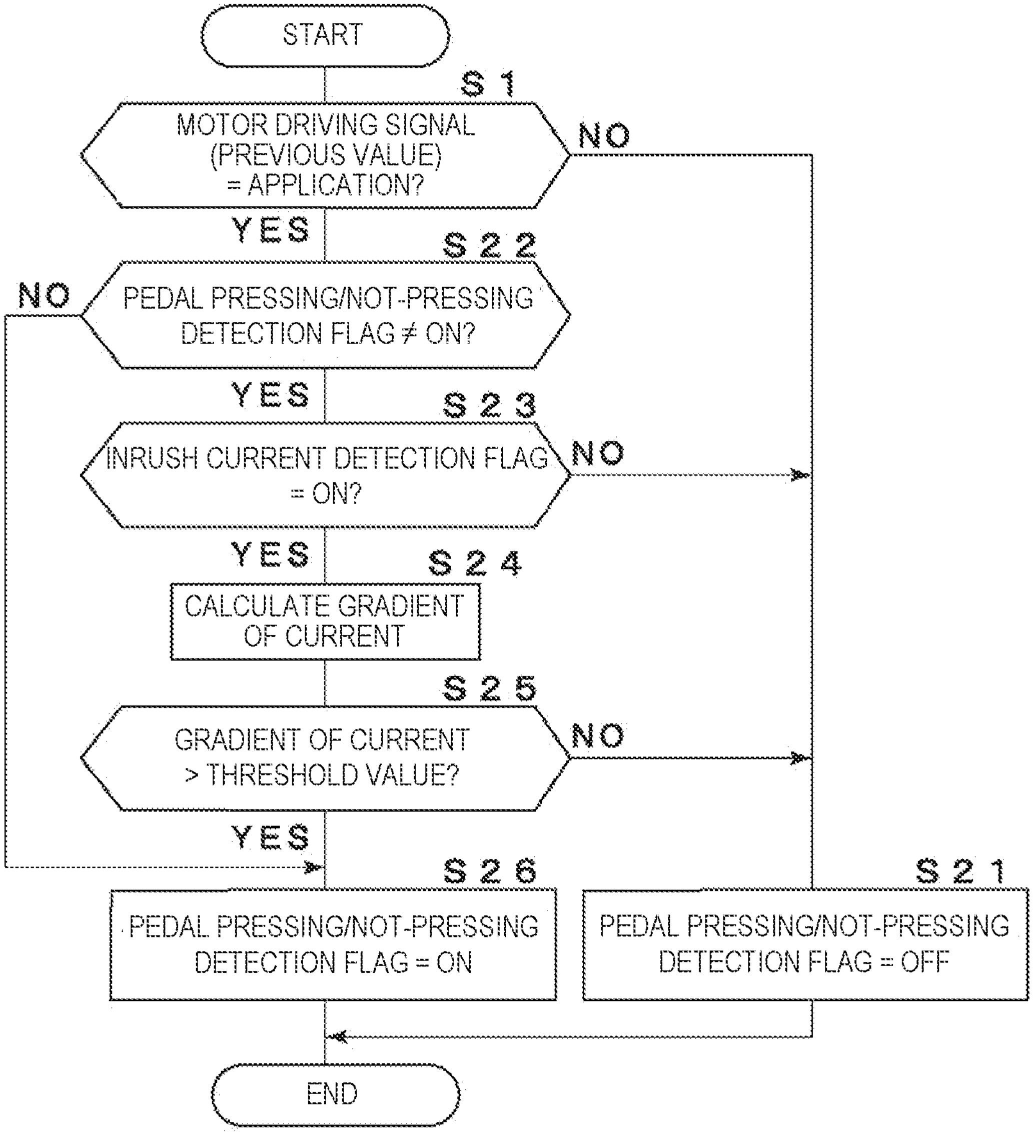
FIG. 7 is a flowchart illustrating processing performed by a pedal pressing/not-pressing detection portion illustrated in FIG. 4 (pedal pressing/not-pressing detection processing).

FIG. 7 illustrates processing for detecting the pedal pressing/not-pressing that is performed by the pedal pressing/not-pressing detection portion 34. The processing illustrated in FIG. 7 is repeatedly performed every predetermined control cycle (for example, 10 ms). After the processing illustrated in FIG. 7 is started, in S1, the pedal pressing/not-pressing detection portion 34 determines whether the motor driving signal (the previous value) corresponding to the motor diving state is the application. Processing in this S1 is similar processing to the processing in S1 illustrated in FIG. 5. If "NO" is determined in S1 in FIG. 7, i.e., the motor driving signal (the previous value) is determined not to be the application, the processing proceeds to S21. In S21, the pedal pressing/not-pressing detection flag is set to "OFF". "OFF" corresponds to "pedal not-pressing". After the pedal pressing/not-pressing detection flag is set to "OFF" in S21, the processing proceeds to END.

On the other hand, if "YES" is determined in S1, i.e., the motor driving signal (the previous value) is determined to be the application, the processing proceeds to S22. In S22, the pedal pressing/not-pressing detection portion 34 determines whether the pedal pressing/not-pressing detection flag is other than "ON". In other words, in S22, the pedal pressing/not-pressing detection portion 34 determines whether the pedal pressing/not-pressing detection flag is "OFF". If "YES" is determined in S22, i.e., the pedal pressing/not-pressing detection flag is determined to be other than "ON" (determined to be "OFF"), the processing proceeds to S23. If "NO" is determined in S22, i.e., the pedal pressing/not-pressing detection flag is determined to be "ON" (determined not to be "OFF"), the processing proceeds to S26.

In S23, the pedal pressing/not-pressing detection portion 34 determines whether the inrush current detection flag is "ON". The inrush current detection flag is input from the inrush current detection portion 32 to the pedal pressing/not-pressing detection portion 34. If "YES" is determined in S23, i.e., the inrush current detection flag is determined to be "ON", the processing proceeds to S24. If "NO" is determined in S23, i.e., the inrush current detection flag is determined not to be "ON", the processing proceeds to S21. In S24, the gradient of the current is calculated. The gradient of the current can be, for example, a difference between the current value in the previous control cycle and the current value in the present control cycle. The current value is input from the current sensor portion 29 to the pedal pressing/not-pressing detection portion 34.

In S25 subsequent to S24, the pedal pressing/not-pressing detection portion 34 compares the gradient of the current calculated in S24 (for example, the difference between the current values) and the threshold value. More specifically, the pedal pressing/not-pressing detection portion 34 determines whether the gradient of the current (for example, the difference between the current values) is greater than the threshold value. The threshold value can be set as a gradient (for example, the difference in the current values) that allows the pedal pressing/not-pressing detection portion 34 to correctly determine that the brake pedal 9 is being pressed (the piston 6D is being advanced by the hydraulic pressure). In this case, the threshold value can be set as, for example, a gradient of the current (for example, the difference in the current values) in a state that the brake pedal 9 is not pressed (no hydraulic pressure is supplied) and the stiffness of the brake pads 6C and the disk rotor 4 is maximized. In this case, the stiffness of the brake pads 6C and the disk rotor 4 is set so as to be maximized with the variation in components, the temperature, and the pad wear amount taken into consideration.

If "NO" is determined in S25, i.e., the gradient of the current (for example, the difference between the current values) is determined not to be greater than the threshold value, the processing proceeds to S21. On the other hand, if "YES" is determined in S25, i.e., the gradient of the current (for example, the difference between the current values) is determined to be greater than the threshold value, the processing proceeds to S26. In S26, the pedal pressing/not-pressing detection flag is set to "ON". "ON" corresponds to "pedal pressing". After the pedal pressing/not-pressing detection flag is set to "ON" in S26, the processing proceeds to END.

The gradient of the current may be the difference between the previous value and the present value, but may also be, for example, a current difference during a predetermined time to prevent an erroneous determination due to noise such as a ripple. The threshold value may be a value acquired by adding an allowance to the value determined assuming that the stiffness is maximized as described above to prevent an erroneous determination. Further, the threshold value is determined based on the variation in the device, the temperature, and the wear amount, but may be variable according to the temperature by estimating the temperature based on the characteristic at the time of heat dissipation.

The pedal pressing/not-pressing may be determined using a hydraulic pressure instead of the gradient of the current. Alternatively, the pedal pressing/not-pressing may be determined based on a load such as a brake switch, a pedal stroke, a pedal pressing force, or the like. However, in this case, the number of employed sensors may increase in addition to a possibility that the system configuration may be complicated. Therefore, the current is preferably used to determine the pedal pressing/not-pressing. Further, when the driver raises or returns the pressing on the brake pedal 9, the gradient of the current may be unable to reach or exceed the threshold value. However, during such a brake pedal operation, the driver is less likely to feel uncomfortable and a safe stop of the vehicle should be prioritized, and therefore the pedal pressing does not have to be detectable.

Next, the application completion determination portion 35 will be described. As illustrated in FIG. 4, the "inrush current detection flag from the inrush current detection portion 32", the "pedal pressing/not-pressing detection flag from the pedal pressing/not-pressing detection portion 34", the "signal (sensor signal) corresponding to the current (the monitored current) from the current sensor portion 29", the "vehicle stop determination flag from the vehicle stop determination portion 33", and the "signal (sensor signal) corresponding to the WC pressure from the WC pressure sensor 21" are input to the application completion determination portion 35. The application completion determination portion 35 determines whether the application is completed based on the inrush current detection flag, the pedal pressing/not-pressing detection flag, the current (the current value), the vehicle stop determination flag, and the WC pressure, and outputs an application completion flag (ON/OFF), which is a result of this determination, to the motor driving signal calculation portion 36. The WC pressure corresponds to, for example, the WC pressure of the disk brake 6 on one side where the electric motor 7A is driven, i.e., the WC pressure of the left-side disk brake 6 in the case of the application completion determination portion 35 of the left-side control portion 31A.

The application completion determination portion 35 calculates a threshold value for the current value with which the driving of the electric motor 7A is stopped (an application completion threshold value) using the pedal pressing/not-pressing detection flag, the WC pressure, and the like, and determines whether it is appropriate to complete the application. In other words, the application completion determination portion 35 calculates the threshold value for the current value with which the driving of the electric motor 7A is stopped (the application completion threshold value) based on the inrush current detection result, the vehicle stop determination result, the pedal pressing/not-pressing detection result, and the WC pressure. The application completion determination portion 35 determines whether it is appropriate to complete the application based on the relationship between the calculated threshold value and the current value. The application completion determination portion 35 outputs a result of this determination (the application completion flag) to the motor driving signal calculation portion 36.

Then, if the vehicle is determined to be stopped and the pedal pressing is determined to be detected, the vehicle is considered to be stopped (parked) by the hydraulic pressure generated due to the driver's pedal pressing, i.e., the braking force based on this hydraulic pressure. Therefore, in this case, the application completion determination portion 35 reduces the current threshold value for completing the application based on the WC pressure to suppress the unconformable feeling that the driver has, and determines the completion of the application based on this reduced current threshold value. On the other hand, when the above-described determination is not established, such as when the vehicle is not determined to be stopped or the pedal pressing is not determined to be detected, the application completion determination portion 35 determines the completion of the application when the current reaches the current threshold value with which a braking force capable of keeping the vehicle stopped in consideration of a slope of a road surface can be generated.

The application completion determination portion 35 sets the application completion threshold value, which is a threshold value for the current with which the driving of the electric motor 7A is stopped, in the following manner. That is, if the inrush current is already detected, the vehicle stop determination flag is ON, the pedal pressing/not-pressing detection flag is ON, and the WC pressure is not an Invalid value (an inappropriate value), the application completion determination portion 35 sets the value calculated based on the WC pressure as the application completion threshold value. On the other hand, if the vehicle stop determination flag is OFF, the pedal pressing/not-pressing detection flag is OFF, or the WC pressure is an Invalid value (an inappropriate value), the application completion determination portion 35 sets a fixed value as the application completion threshold value. Then, when the current exceeds the application completion threshold value, the application completion flag is set to ON. On the other hand, if the current is equal to or lower than the application completion threshold value or the inrush current detection flag is OFF, the application completion flag is set to OFF.

Figure 8:
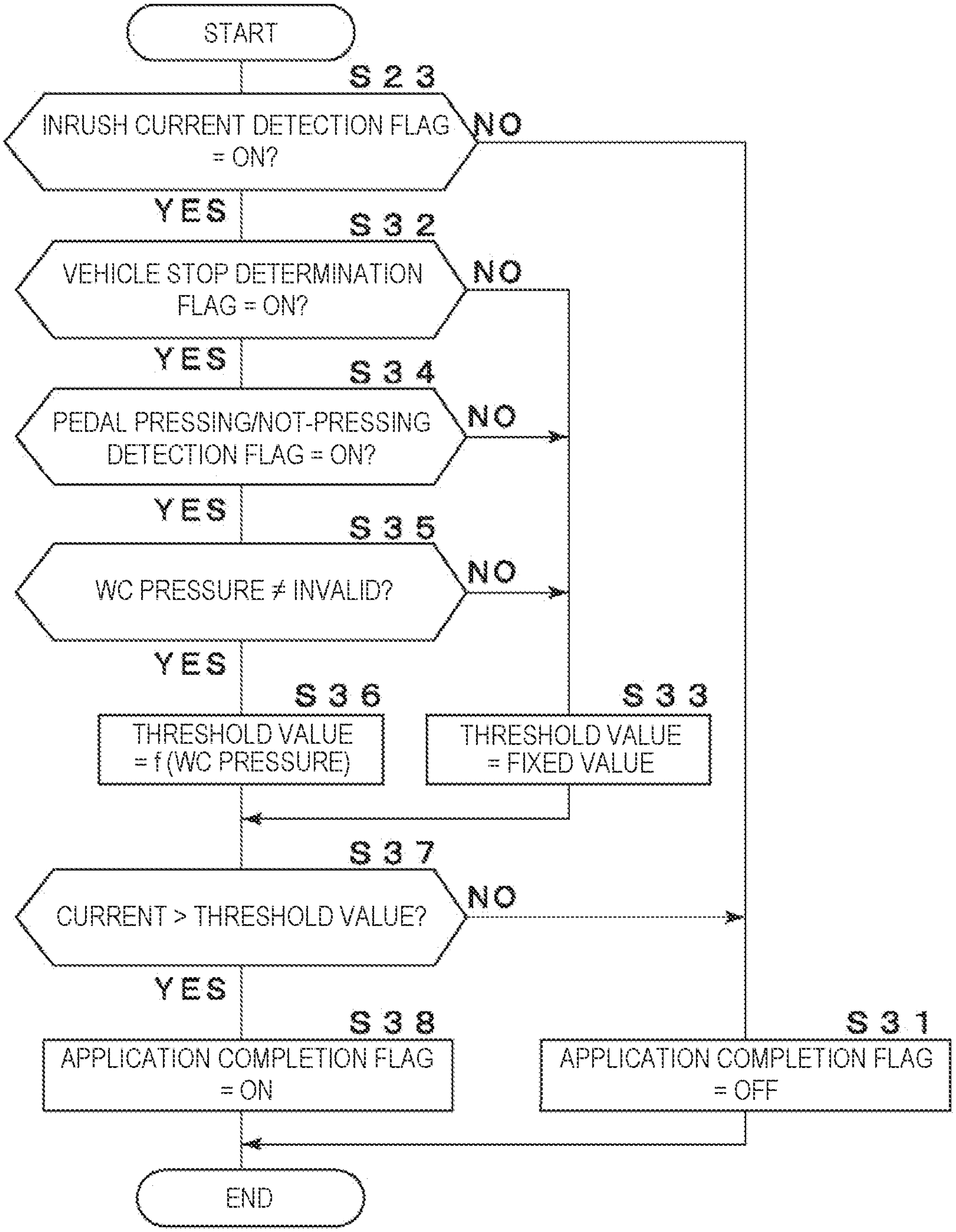
FIG. 8 is a flowchart illustrating processing performed by an application completion determination portion illustrated in FIG. 4 (application completion determination processing).

FIG. 8 illustrates processing for determining the completion of the application that is performed by the application completion determination portion 35. The processing illustrated in FIG. 8 is repeatedly performed every predetermined control cycle (for example, 10 ms). After the processing in FIG. 8 is started, in S23, the application completion determination portion 35 determines whether the inrush current detection flag is "ON". S23 is similar processing to S23 illustrated in FIG. 7. If "NO" is determined in S23 in FIG. 8, i.e., the inrush current detection flag is determined not to be "ON", the processing proceeds to S31. In S31, the application completion flag is set to "OFF". "OFF" corresponds to a state that "the application is not completed". After the application completion flag is set to "OFF" in S31, the processing proceeds to END.

On the other hand, if "YES" is determined in S23, i.e., the inrush current detection flag is determined to be "ON", the processing proceeds to S32. In S32, the application completion determination portion 35 determines whether the vehicle stop determination flag is "ON". The vehicle stop determination flag is input from the vehicle stop determination portion 33 to the application completion determination portion 35. If "NO" is determined in S32, i.e., the vehicle stop determination flag is determined not to be "ON", the processing proceeds to S33. In S33, the threshold value (the application completion flag) is set to the fixed value. The fixed value will be described below. After the threshold value (the application completion flag) is set to the fixed value in S33, the processing proceeds to S37. On the other hand, if "YES" is determined in S32, i.e., the vehicle stop determination flag is determined to be "ON", the processing proceeds to S34.

In S34, the application completion determination portion 35 determines whether the pedal pressing/not-pressing detection flag is "ON". The pedal pressing/not-pressing detection flag is input from the pedal pressing/not-pressing detection portion 34 to the application completion determination portion 35. If "NO" is determined in S34, i.e., the pedal pressing/not-pressing detection flag is determined not to be ON", the processing proceeds to S33. On the other hand, if "YES" is determined in S34, i.e., the pedal pressing/not-pressing detection flag is determined to be "ON", the processing proceeds to S35.

In S35, the application completion determination portion 35 determines whether the WC pressure (the WC pressure on the left side) is other than an Invalid value (an inappropriate value). The Invalid value (the inappropriate value) corresponds to, for example, a value that deviates from a value under a normal condition or a value when the WC pressure cannot be normally acquired due to a malfunction of the WC pressure sensor 21 or the like. If "NO" is determined in S35, i.e., the WC pressure is determined to be an Invalid value (an inappropriate value), the processing proceeds to S33. On the other hand, if "YES" is determined in S35, i.e., the WC pressure is determined to be other than an Invalid value (an inappropriate value), the processing proceeds to S36.

Figure 9:
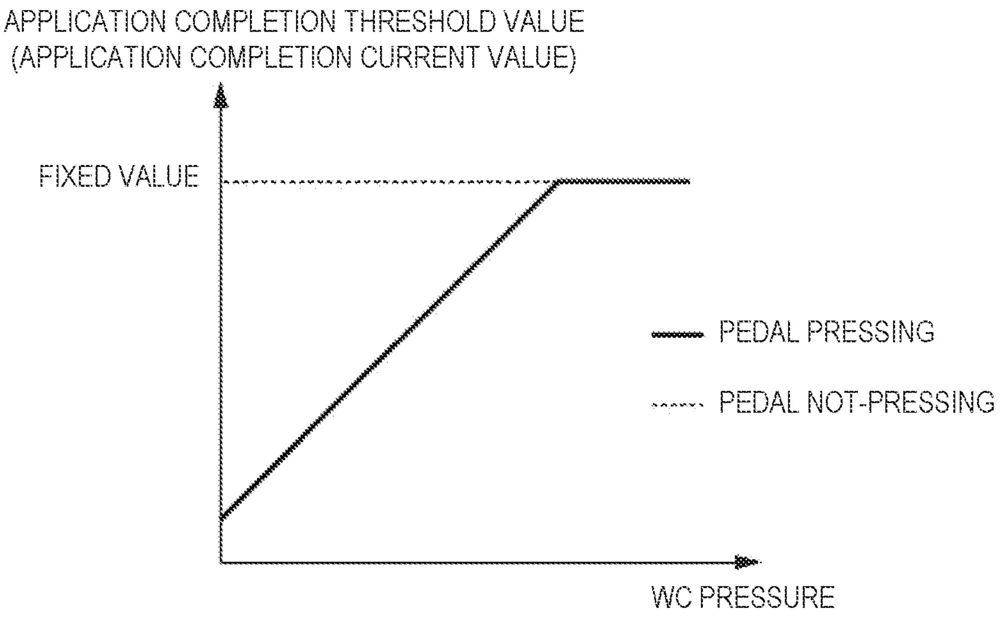
FIG. 9 is a characteristic line diagram illustrating one example of the relationship between a WC pressure (a hydraulic pressure) and an application completion threshold value.

In S36, the application completion determination portion 35 sets the threshold value (the application completion threshold value) based on the relationship between the WC pressure and the application completion threshold value (a map) illustrated in FIG. 9. Now, the application completion threshold value according to the hydraulic pressure will be described. When the brake pedal 9 is pressed, the brake pads 6C are pressed against the disk rotor 4 by the hydraulic pressure. Therefore, the current rapidly increases until overcoming the reaction force to the pressing force derived from the hydraulic pressure. The current value for overcoming the reaction force can be calculated based on the WC pressure, a mechanical variation in the brake pads 6C and the disk rotor 4, the temperature, and the pad wear amount. Further, the temperature can be estimated based on the heat dissipation characteristic, and therefore the increasing current value may be calculated as needed using the estimated temperature and the WC pressure.

However, considering the processing load, it is preferable to use a table value (a map) designed as illustrated in FIG. 9. Regarding the application completion threshold value, the vehicle can be kept in the stopped state even with the slope of the road surface taken into consideration when the current value increases to the value set as the fixed value. Therefore, the application completion threshold value is set in such a manner that the current value does not exceed the fixed value. Alternatively, if "NO" is determined in any of S32 to S35, the application completion threshold value is set to the fixed value illustrated in FIG. 9. On the other hand, if "YES" is determined in S35, the application completion threshold value corresponding to the WC pressure at that time (the WC pressure in the present control cycle) is set as the threshold value based on the characteristic (the relationship) between the WC pressure and the application completion threshold value indicated by a solid line in FIG. 9. In other words, when the vehicle stop determination is established and the pedal pressing is determined to be detected, the vehicle has been able to be stopped safely and therefore the application completion threshold value is set to a lower value than when the pedal not-pressing is detected according to the generated WC pressure.

After the application completion threshold value corresponding to the WC pressure at that time is set as the threshold value in S36 or the fixed value is set as the threshold value in S33, the processing proceeds to S37. In S37, the current value in the present control cycle and the threshold value (the application completion threshold value) set in S36 or S33 are compared with each other. More specifically, in S37, the application completion determination portion 35 determines whether the current value is higher than the threshold value (the application completion threshold value). If "NO" is determined in S37, i.e., the current value is determined to be equal to or lower than the threshold value (the application completion threshold value), the processing proceeds to S31. On the other hand, if "YES" is determined in S37, i.e., the current value is determined to be higher than the threshold value (the application completion threshold value), the processing proceeds to S38. In S38, the application completion flag is set to "ON". "ON" corresponds to a state that "the application is completed". After the application completion flag is set to "ON" in S38, the processing proceeds to END.

A current value corresponding to a thrust force capable of keeping the vehicle in the stopped state even with the slope of the road surface taken into consideration is employed as the fixed value used as the application completion threshold value. If the vehicle has not been stopped even with the brake pedal 9 pressed or the WC pressure is unknown, safely stopping the vehicle should be prioritized. Therefore, if the vehicle stop determination flag is OFF or the WC pressure is an Invalid value (an inappropriate value), the fixed value is used as the application completion threshold value. Further, although the WC pressure is used in the embodiment, for example, the MC pressure or an estimated hydraulic pressure may be used. However, it is preferable to use the WC pressure generated actually in the caliper. Further, the application completion determination portion 35 determines the completion of the application based on the current in the embodiment, but, for example, may determine that the piston is advanced more than the pedal pressing based on the load imposed on the PKB mechanism, the stroke of the PKB mechanism, the driving time of the electric motor, and/or a change in the WC pressure, thereby determining the completion of the application.

Next, the motor driving signal calculation portion 36 will be described. As illustrated in FIG. 4, the "application/release request (the PKB actuation request) based on the signal from the parking brake switch 23, the signal derived from the determination of the automatic application/automatic release, or the like" and the "application completion flag from the application completion determination portion 35" are input to the motor driving signal calculation portion 36. The motor driving signal calculation portion 36 calculates an instruction signal to output to the motor driving circuit 28, i.e., an instruction signal requesting the motor driving circuit 28 to set the power supply to ON (drive the electric motor)/OFF (stop the electric motor)/shorting based on the application/release request and the application completion flag. In this case, the motor driving signal calculation portion 36 calculates the motor driving signal to prevent various kinds of determinations from being established under an unintended scene and issue an instruction to the driving circuit. The motor driving signal calculation portion 36 outputs the calculated motor driving signal to the motor driving circuit 28. Further, the motor driving signal calculation portion 36 outputs the calculated motor driving signal to the inrush current detection portion 32 and the pedal pressing/not-pressing detection portion 34.

In other words, the motor driving signal calculation portion 36 confirms the driving state in the various determinations and calculates the motor driving signal to be used as the instruction value directed to the motor driving circuit 28. In this case, the motor driving signal calculation portion 36 calculates the motor driving signal using the application/release request, the application completion determination result, a release completion determination result, and a motor rotational speed. For this purpose, the release completion determination result (a release completion flag) from a release completion determination portion and the motor rotational speed are also input to the motor driving signal calculation portion 36, although being omitted in the illustration.

Figures 10, 11:
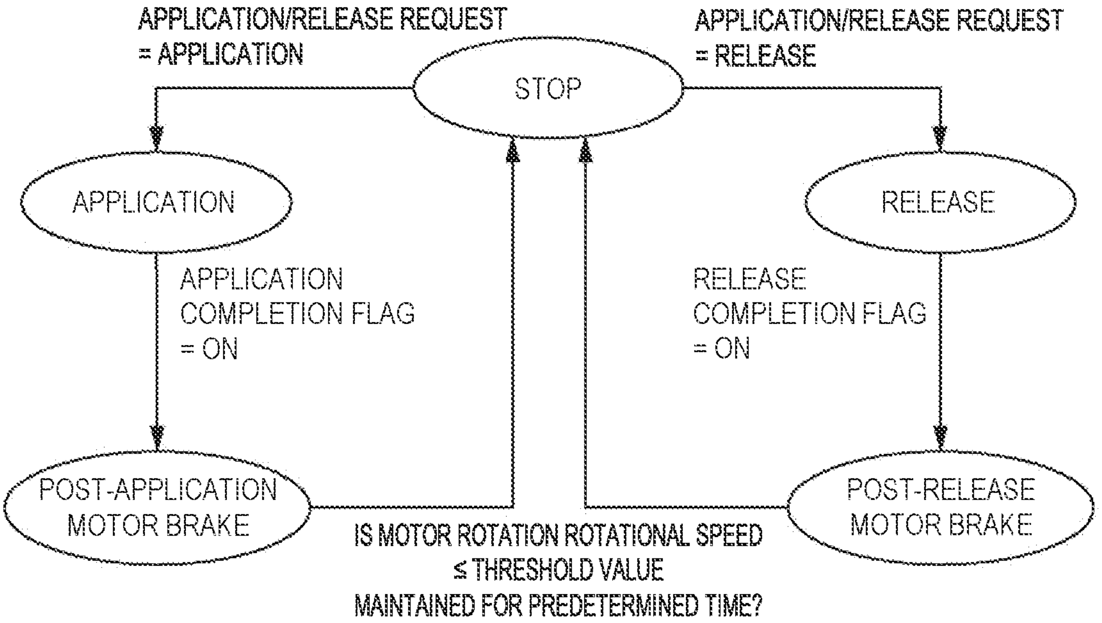
FIG. 10 illustrates processing by a motor driving signal calculation portion illustrated in FIG. 4 (motor driving signal calculation processing).
FIG. 11 illustrates one example of the relationship between a motor driving instruction (a motor driving signal) and an operation of a driving circuit as a list.

As illustrated in FIG. 10, if the application/release request is switched to the application with the motor driving signal in the "stop" state, the motor driving signal calculation portion 36 sets the motor driving signal to "application". If the application/release request is switched to the release with the motor driving signal in the "stop" state, the motor driving signal calculation portion 36 sets the motor driving signal to "release".

If the application completion flag is switched to ON with the motor driving signal in the "application" state, the motor driving signal calculation portion 36 sets the motor driving signal to "post-application motor brake". If the release completion flag is switched to ON with the motor driving signal in the "release" state, the motor driving signal calculation portion 36 sets the motor driving signal to "post-release motor brake".

If the motor rotational speed is kept in a state of being equal to or lower than a threshold value for a predetermined time with the motor driving signal in "post-application motor brake" or "post-release motor brake" state, the motor driving signal calculation portion 36 sets the motor driving signal to "stop". The motor driving signal is output to the motor driving circuit 28, the inrush current detection portion 32, and the pedal pressing/not-pressing detection portion 34. FIG. 11 illustrates the operation of the motor driving circuit 28 in reaction to the motor driving signal.

In this manner, in the embodiment, the rear wheel-side disk brake 6 and the braking control apparatus 17 (the parking brake control apparatus 31) constitute the brake apparatus. The rear wheel-side disk brake 6 includes the hydraulic mechanism (the caliper 6B and the piston 6D) and the parking brake mechanism (the electric motor 7A and the rotation-linear motion conversion mechanism 8). The braking control apparatus 17 (the parking brake control apparatus 31) includes the control portion (the arithmetic circuit 24) configured to control the electric motor 7A. The hydraulic mechanism provides the braking force to the vehicle by pressing the frictional member (the brake pads 6C) against the rotational member (the disk rotor 4) rotating together with the wheel (the rear wheel 3) based on the hydraulic pressure. The parking brake mechanism holds the braking force by the electric motor 7A controlled by the control portion (the arithmetic circuit 24).

The control portion (the arithmetic circuit 24) of the braking control apparatus 17 (the parking brake control apparatus 31) acquires a first physical amount (for example, the gradient of the change in the current) indicating a change in the current applied to the electric motor 7A, the hydraulic pressure, or a physical amount regarding the stroke of the brake pedal at the time of the application operation, which is the holding operation of the parking brake mechanism. The control portion (the arithmetic circuit 24) sets a second physical amount indicating the completion of the application operation (for example, the "threshold value" in S37 in FIG. 8) so as to make it smaller when the first physical amount (for example, the gradient of the change in the current) exceeds a predetermined threshold value (for example, the "threshold value" in S25 in FIG. 7), compared to when the first physical amount (for example, the gradient of the change in the current) is equal to or smaller than the threshold value. The control portion (the arithmetic circuit 24) determines the completion of the application operation when a physical amount indicating the application operation (for example, the current value) reaches the second physical amount (for example, the "threshold value" in S37 in FIG. 7).

Then, in the embodiment, the first physical amount is the gradient of the change in the current. The second physical amount is the current value indicating the completion of the application operation. In other words, at the time of the application operation, the control portion (the arithmetic circuit 24) sets the current value indicating the completion of the application operation (for example, the "threshold value" in S37 in FIG. 8) so as to make it smaller when the gradient of the change in the current after the inrush current flowing in the electric motor 7A is detected exceeds the predetermined threshold value (for example, the "threshold value" in S25 in FIG. 7), compared to when the gradient of the change in the current is equal to or smaller than the threshold value. Further, the control portion (the arithmetic circuit 24) determines that the brake pedal 9 is pressed by a passenger of the vehicle (sets the pedal pressing/not-pressing detection flag to ON) by the processing in S26 in FIG. 7, when the first physical amount (for example, the gradient of the change in the current) exceeds the predetermined threshold value by the processing in S25 in FIG. 7.

Further, when the vehicle is determined to be stopped, i.e., the vehicle stop determination flag is set to ON in S14 in FIG. 6 and "YES" is determined in S32 in FIG. 8, the control portion (the arithmetic circuit 24) sets the second physical amount (for example, the "threshold value" in S37 in FIG. 8) so as to make it smaller when the first physical amount (for example, the gradient of the change in the current) exceeds the predetermined threshold value (for example, the "threshold value" in S25 in FIG. 7). In this case, as illustrated in FIG. 9, the control portion (the arithmetic circuit 24) reduces the second physical amount (for example, the application completion threshold value, which is the application completion current value) according to the magnitude of the hydraulic pressure (the WC pressure).

The brake system of the four-wheeled automobile according to the embodiment is configured in the above-described manner, and the operation thereof will be described next.

When the driver of the vehicle operates the brake pedal 9 by pressing it, this pressing force is transmitted to the master cylinder 12 via the booster 11, and the brake hydraulic pressure is generated by the master cylinder 12. The brake hydraulic pressure generated in the master cylinder 12 is supplied to the individual disk brakes 5 and 6 via the cylinder-side hydraulic pressure pipes 14A and 14B, the ESC 16, and the brake-side pipe portions 15A, 15B, 15C, and 15D, and the braking force is provided to each of the left and right front wheels 2 and the left and right rear wheels 3.

In this case, in each of the disk brakes 5 and 6, the piston 5B or 6D is slidably displaced toward the brake pads 6C according to an increase in the brake hydraulic pressure in the caliper 5A or 6B, and the brake pads 6C are pressed against the disk rotor 4 or 4. As a result, the braking force based on the hydraulic pressure is provided. On the other hand, when the brake operation is released, the supply of the brake hydraulic pressure into the caliper 5A or 6B is stopped, which causes the piston 5B or 6D to be displaced so as to separate (retract) from the disk rotor 4 or 4. As a result, the brake pads 6C separate from the disk rotor 4 or 4, and the vehicle is returned into a non-braked state.

Next, when the driver of the vehicle operates the parking brake switch 23 toward the braking side (the application side), power is supplied from the braking control apparatus 17 (the parking brake control apparatus 31) to the electric motor 7A of the rear wheel-side disk brake 6 on each of the left side and the right side, and the electric motor 7A is rotationally driven. On the rear wheel-side disk brake 6, the rotational motion of the electric motor 7A is converted into the linear motion by the rotation-linear motion conversion mechanism 8, and the piston 6D is thrust by the rotation-linear motion member 8A. As a result, the disk rotor 4 is pressed by the brake pads 6C. At this time, the rotation-linear motion conversion mechanism 8 (the liner motion member 8A2) is kept in the braking state with the aid of, for example, the frictional force (the holding force) due to the threaded engagement. As a result, the rear wheel-side disk brake 6 is actuated (applied) as the parking brake. In other words, even after the power supply to the electric motor 7A is stopped, the piston 6D is held at the braking position by the rotation-linear motion conversion mechanism 8.

On the other hand, when the driver operates the parking brake switch 23 toward the braking release side (the release side), power is supplied from the braking control apparatus 17 (the parking brake control apparatus 31) to the electric motor 7A so as to rotate the motor in the reverse direction. Due to this power supply, the electric motor 7A is rotated in the opposite direction from the direction at the time of the actuation of the parking brake (the application). At this time, the braking force maintained by the rotation-linear motion conversion mechanism 8 is released, which allows the piston 6D to be displaced in a direction away from the disk rotor 4. As a result, the actuation of the rear wheel-side disk brake 6 as the parking brake is stopped (released).

Then, according to the embodiment, the control portion (the arithmetic circuit 24) of the braking control apparatus 17 (the parking brake control apparatus 31) can reduce the second physical amount serving as the threshold value for completing the application operation (the application completion threshold value) by the processing in S36 in FIG. 8 if the first physical amount (the gradient of the change in the current) exceeds the predetermined threshold value by the driver's pressing the brake pedal 9, i.e., "YES" is determined in S25 in FIG. 7 at the time of the application operation. Due to that, the change in the hydraulic pressure can be suppressed even without the change in the hydraulic pressure compensated for using, for example, the electric booster at the time of the application operation. As a result, the uncomfortable feeling toward the brake pedal reaction force when the PKB mechanism is actuated can be suppressed regardless of the configuration of the brake system.

According to the embodiment, the first physical amount is the gradient of the change in the current. Therefore, the second physical amount (the application completion threshold value) can be reduced based on the gradient of the change in the current at the time of the application operation. In this case, the state of the hydraulic pressure, i.e., whether the brake pedal 9 is pressed can be accurately acquired based on the gradient of the change in the current. As a result, the second physical amount can be reduced when the brake pedal 9 is pressed and the uncomfortable feeling toward the brake pedal reaction force can be suppressed at the time of the application operation.

According to the embodiment, the second physical amount is the current value (the application completion threshold value). Therefore, when the first physical amount (the gradient of the change in the current) exceeds the predetermined threshold value, the current value indicating the completion of the application operation (the application completion threshold value) is reduced as illustrated in FIG. 9. As a result, the application operation can be completed with the reduced current value (the application completion threshold value), and the change in the hydraulic pressure at the time of the application operation can be suppressed.

According to the embodiment, the control portion (the arithmetic circuit 24) performs the processing in S5 in FIG. 5 and the processing in S23 in FIG. 7. Therefore, when the gradient of the change in the current after the inrush current is detected exceeds the predetermined threshold value, the current value indicating the completion of the application operation (the application completion threshold value) can be reduced. Therefore, the second physical amount (the application completion threshold value) can be prevented from being reduced based on the gradient of the current change of the inrush current.

According to the embodiment, when the first physical amount (the gradient of the change in the current) exceeds the predetermined threshold value, i.e., if "YES" is determined in S25 in FIG. 7, the control portion (the arithmetic circuit 24) sets the pedal pressing/not-pressing detection flag to ON in S26, thereby determining that the brake pedal 9 is pressed by a passenger of the vehicle. Therefore, the second physical amount indicating the completion of the application operation (the application completion threshold value) can be reduced by the processing in S34 in FIG. 8, when the brake pedal 9 is determined to be pressed based on the first physical amount (the gradient of the change in the current) by the processing in S25 and S26 in FIG. 7.

According to the embodiment, the control portion (the arithmetic circuit 24) determines the stop of the vehicle at the time of the application operation by performing the processing illustrated in FIG. 6. After that, the control portion (the arithmetic circuit 24) reduces the second physical amount indicating the completion of the application operation (the application completion threshold value) by the processing in S36 if "YES is determined by the processing in S32 in FIG. 8 and "YES" is determined by the processing in S34 in FIG. 8. Therefore, when the vehicle is not stopped, i.e., when the vehicle is running, the second physical amount (the application completion threshold value) can be prohibited from being reduced. As a result, when the braking force by the PKB mechanism is required while the vehicle is running, an increase in the braking force can be prioritized over the suppression of the uncomfortable feeling toward the brake pedal reaction force.

According to the embodiment, the control portion (the arithmetic circuit 24) reduces the second physical amount (the application completion current value) according to the magnitude of the hydraulic pressure (the WC pressure), as illustrated in FIG. 9. Therefore, regardless of whether the hydraulic pressure (the WC pressure) is high or low, the second physical amount (the application completion threshold value) can be adjusted according to the hydraulic pressure (the WC pressure) at that time. As a result, the uncomfortable feeling toward the brake pedal reaction force can be suppressed regardless of whether the hydraulic pressure (the WC pressure) is high or low.

The embodiment has been described citing the example in which the change in the current applied to the electric motor 7A (the gradient or the inclination of the change in the current, more specifically, the difference that is the change amount of the current value during the predetermined time) is used as the first physical amount (the physical amount relating to the hydraulic pressure) at the time of the application operation. However, the first physical amount is not limited thereto, and, for example, a physical amount regarding the stroke of the brake pedal may be used as the first physical amount. Alternatively, the hydraulic pressure may be directly used as the first physical amount.

The embodiment has been described citing the example in which the current supplied to the electric motor 7A (the application completion current value) is used as the second physical amount (the physical amount relating to the completion of the application operation) at the time of the application operation. However, the second physical amount is not limited thereto, and, for example, the driving time of the electric motor, the rotational amount, the displacement amount (the stroke amount) of the PKB mechanism (the linear motion member), the stroke amount of the piston, or the thrust force of the piston (the load) may be used as the second physical amount. In this case, the driving time, the rotational amount, the displacement amount (the stroke amount) of the PKB mechanism (the linear motion member), the stroke amount of the piston, or the thrust force of the piston (the load) used as the second physical amount can be reduced.

The embodiment has been described citing the example in which the hydraulic disk brake equipped with the electric parking brake function is employed as the rear wheel-side disk brake 6, and, along therewith, the hydraulic disk brake unequipped with the electric parking brake function is employed as the front wheel-side disk brake 5. However, the rear wheel-side disk brake 6 and the front wheel-side disk brake 5 are not limited thereto, and, for example, the hydraulic disk brake unequipped with the electric parking brake function may be employed as the rear wheel-side disk brake 6, and, along therewith, the hydraulic disk brake equipped with the electric parking brake function may be employed as the front wheel-side disk brake 5. Further, the hydraulic disk brake equipped with the electric parking brake function may be employed as both the front wheel-side disk brake 5 and the rear wheel-side disk brake 6. In sum, the brakes on at least a pair of left and right wheels, among the wheels of the vehicle, can be constituted by the electric parking brake.

The embodiment has been described citing the hydraulic disk brake 6 equipped with the electric parking brake as the electric brake (the electric brake mechanism) by way of example. However, the brake mechanism is not limited to the disk brake-type brake mechanism, and may be configured as a drum brake-type brake mechanism. Further examples of the configuration employable as the electric parking brake include various types of brake mechanisms, such as a drum-in disk brake in which a drum-type electric parking brake is provided in a disk brake, and a configuration that holds the parking bake by pulling a cable using an electric motor.

According to the above-described embodiment, the control portion reduces the second physical amount indicating the completion of the application operation when the first physical amount exceeds the predetermined threshold value at the time of the application operation, and determines the completion of the application when the physical amount indicating the application operation reaches the second physical amount. Therefore, when the first physical amount exceeds the predetermined threshold value due to, for example, the driver's pressing the brake pedal, the second physical amount, which serves as the threshold value for completing the application operation, can be reduced. Due to that, the change in the hydraulic pressure can be suppressed even without the change in the hydraulic pressure compensated for using, for example, the electric booster at the time of the application operation. As a result, the uncomfortable feeling toward the brake pedal reaction force when the parking brake mechanism (the electric parking brake mechanism) is actuated can be suppressed regardless of the configuration of the brake system.

According to the embodiment, the first physical amount is the gradient of the change in the current. Therefore, the second physical amount can be reduced based on the gradient of the change in the current at the time of the application operation. In this case, the state of the hydraulic pressure, i.e., whether the brake pedal is pressed can be accurately acquired based on the gradient of the change in the current. As a result, the second physical amount can be reduced when the brake pedal is pressed and the uncomfortable feeling toward the brake pedal reaction force can be suppressed at the time of the application operation.

According to the embodiment, the second physical amount is the current value. Therefore, when the first physical amount (for example, the gradient of the change in the current) exceeds the predetermined threshold value, the current value indicating the completion of the application operation is reduced. As a result, the application operation can be completed with the reduced current value, and the change in the hydraulic pressure at the time of the application operation can be suppressed.

According to the embodiment, when the gradient of the change in the current after the inrush current is detected exceeds the predetermined threshold value, the control portion reduces the current value indicating the completion of the application operation. Therefore, the second physical amount can be prevented from being reduced based on the gradient of the current change of the inrush current.

According to the embodiment, the control portion determines that the brake pedal is pressed by a passenger of the vehicle when the first physical amount exceeds the predetermined threshold value. Therefore, the second physical amount indicating the completion of the application operation can be reduced when the brake pedal is determined to be pressed based on the first physical amount.

According to the embodiment, the control portion determines the stop of the vehicle at the time of the application operation. In other words, the control portion reduces the second physical amount indicating the completion of the application operation when the vehicle is determined to be stopped and the first physical amount exceeds the predetermined threshold value. Therefore, when the vehicle is not stopped, i.e., when the vehicle is running, the second physical amount can be prohibited from being reduced. As a result, when the braking force by the parking brake mechanism is required while the vehicle is running, an increase in the braking force can be prioritized over the suppression of the uncomfortable feeling toward the brake pedal reaction force.

According to the embodiment, the control portion reduces the second physical amount according to the magnitude of the hydraulic pressure. Therefore, regardless of whether the hydraulic pressure is high or low, the second physical amount can be adjusted according to the hydraulic pressure at that time. As a result, the uncomfortable feeling toward the brake pedal reaction force can be suppressed regardless of whether the hydraulic pressure is high or low.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2021-085002 filed on May 20, 2021. The entire disclosure of Japanese Patent Application No. 2021-085002 filed on May 20, 2021 including the specification, the claims, the drawings, and the abstract is incorporated herein by reference in its entirety.

REFERENCE SIGNS LIST

3 rear wheel (wheel)
4 disk rotor (rotational member)
6 rear wheel-side disk brake (brake apparatus, hydraulic mechanism, or parking brake mechanism)
6B caliper (hydraulic mechanism)
6C brake pad (frictional member)
6D piston (hydraulic mechanism)
7A electric motor (parking brake mechanism)
8 rotation-linear motion conversion mechanism (parking brake mechanism)
17 braking control apparatus (control apparatus)
24 arithmetic circuit (control portion)
31 parking brake control apparatus (control apparatus)

The invention claimed is:

1. A control apparatus for a brake apparatus, comprising:
a hydraulic mechanism configured to provide a braking force to a vehicle by pressing a frictional member against a rotational member rotating together with a wheel based on a hydraulic pressure; and
a parking brake mechanism configured to hold the braking force by an electric motor controlled by a control portion,
wherein the control portion is configured to
acquire a first physical amount at the time of an application operation, the first physical amount indicating a change in a current applied to the electric motor, the hydraulic pressure, or a physical amount regarding a stroke of a brake pedal, the application operation being a holding operation of the parking brake mechanism,
set a second physical amount indicating completion of the application operation so as to be smaller when the first physical amount exceeds a predetermined threshold value, as compared to when the first physical amount is equal to or smaller than the threshold value, and
determine the completion of the application operation when a detected physical amount indicating the application operation reaches the second physical amount,
wherein the first physical amount is a gradient of the change in the current.

2. The control apparatus for the brake apparatus according to claim 1, wherein the second physical amount is a current value indicating the completion of the application operation.

3. The control apparatus for the brake apparatus according to claim 2, wherein, at the time of the application operation, the control portion sets the current value indicating the completion of the application operation so as to be lower when the gradient of the change in the current after an inrush current flowing in the electric motor is detected exceeds the threshold value, as compared to when the gradient of the change in the current is equal to or smaller than the threshold value.

4. The control apparatus for the brake apparatus according to claim 1, wherein the control portion determines that the brake pedal is pressed by a passenger of the vehicle when the first physical amount exceeds the threshold value.

5. The control apparatus for the brake apparatus according to claim 1, wherein, when the vehicle is determined to be stopped, the control portion
sets the second physical amount indicating the completion of the application operation so as to be smaller when the first physical amount exceeds the threshold value, as compared to when the first physical amount is equal to or smaller than the threshold value, and
determines the completion of the application operation when the detected physical amount indicating the application operation reaches the second physical amount.

6. The control apparatus for the brake apparatus according to claim 1, wherein the control portion reduces the second physical amount according to a magnitude of the hydraulic pressure.

7. A method for controlling a brake apparatus,
the brake apparatus including a hydraulic mechanism configured to provide a braking force to a vehicle by pressing a frictional member against a rotational member rotating together with a wheel based on a hydraulic pressure, and a parking brake mechanism configured to hold the braking force by an electric motor,
the method comprising:
causing a control portion configured to control driving of the electric motor to
acquire a first physical amount at the time of an application operation, the first physical amount indicating a change in a current applied to the electric motor, the hydraulic pressure, or a physical amount regarding a stroke of a brake pedal, the application operation being a holding operation of the parking brake mechanism;
set a second physical amount indicating completion of the application operation so as to be smaller when the first physical amount exceeds a predetermined threshold value, as compared to when the first physical amount is equal to or smaller than the threshold value; and
determine the completion of the application operation when a detected physical amount indicating the application operation reaches the second physical amount,
wherein the first physical amount is a gradient of the change in the current.

8. A brake apparatus comprising:
a hydraulic mechanism configured to provide a braking force to a vehicle by pressing a frictional member against a rotational member rotating together with a wheel based on a hydraulic pressure;

a parking brake mechanism configured to hold the braking force by an electric motor; and a control apparatus including a control portion configured to control the electric motor, wherein the control portion is configured to acquire a first physical amount at the time of an application operation, the first physical amount indicating a change in a current applied to the electric motor, the hydraulic pressure, or a physical amount regarding a stroke of a brake pedal, the application operation being a holding operation of the parking brake mechanism, set a second physical amount indicating completion of the application operation so as to be smaller when the first physical amount exceeds a predetermined threshold value, as compared to when the first physical amount is equal to or smaller than the threshold value, and determine the completion of the application operation when a detected physical amount indicating the application operation reaches the second physical amount, wherein the first physical amount is a gradient of the change in the current.

* * * * *